United States Patent
Hayakawa et al.

(10) Patent No.: US 9,886,140 B2
(45) Date of Patent: Feb. 6, 2018

(54) LIGHT EMITTING DEVICE AND IMAGE DISPLAY SYSTEM

(71) Applicant: SEIKO EPSON CORPORATION, Tokyo (JP)

(72) Inventors: Junya Hayakawa, Azumino (JP); Hiroshi Abe, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 88 days.

(21) Appl. No.: 15/027,075

(22) PCT Filed: Oct. 28, 2014

(86) PCT No.: PCT/JP2014/005453
§ 371 (c)(1),
(2) Date: Apr. 4, 2016

(87) PCT Pub. No.: WO2015/064091
PCT Pub. Date: May 7, 2015

(65) Prior Publication Data
US 2016/0246448 A1 Aug. 25, 2016

(30) Foreign Application Priority Data
Oct. 31, 2013 (JP) .................................. 2013-226820

(51) Int. Cl.
*G06F 3/042* (2006.01)
*F21V 14/02* (2006.01)
*F21V 15/01* (2006.01)

(52) U.S. Cl.
CPC ............ *G06F 3/0425* (2013.01); *F21V 14/02* (2013.01); *F21V 15/012* (2013.01)

(58) Field of Classification Search
None
See application file for complete search history.

(56) References Cited

U.S. PATENT DOCUMENTS

2003/0223245 A1* 12/2003 Abe ..................... B60Q 1/0683
362/523
2008/0291164 A1 11/2008 Tanaka
(Continued)

FOREIGN PATENT DOCUMENTS

JP    2001-290600 A    10/2001
JP    2003-091358 A    3/2003
(Continued)

OTHER PUBLICATIONS

Jan. 13, 2015 Search Report issued in International Patent Application No. PCT/JP2014/005453.

*Primary Examiner* — Duane N Taylor, Jr.
(74) *Attorney, Agent, or Firm* — Oliff PLC

(57) ABSTRACT

To provide a light emitting device capable of adjusting an emission direction of light, and an image display system. Disclosed is a light emitting device including: a light source unit emitting light to a region along a predetermined flat surface; a frame in which the light source unit is provided; and an adjustment mechanism that adjusts an emission direction of light emitted from the light source unit, relative to the predetermined flat surface. Since the frame is provided with the adjustment mechanism adjusting the emission direction of light emitted from the light source unit, relative to the predetermined flat surface, it is possible to adjust the inclination of the frame relative to the predetermined flat surface. As a result, it is possible to adjust the emission direction of light emitted from the light source unit.

17 Claims, 14 Drawing Sheets

(56) References Cited

U.S. PATENT DOCUMENTS

| | | | | |
|---|---|---|---|---|
| 2011/0279361 A1* | 11/2011 | Onishi | ............... | G06F 3/0428 345/156 |
| 2012/0242880 A1* | 9/2012 | Kubo | ................ | G06F 3/042 348/333.1 |
| 2014/0246573 A1* | 9/2014 | Takeda | ............... | H04N 9/3129 250/235 |

FOREIGN PATENT DOCUMENTS

| JP | 2008-052366 A | 3/2008 |
|---|---|---|
| JP | 4757144 B2 | 8/2011 |

* cited by examiner

LIGHT EMITTING DEVICE AND IMAGE DISPLAY SYSTEM

TECHNICAL FIELD

The present invention relates to a light emitting device and an image display system.

BACKGROUND ART

In the related art, a coordinate input device, which detects the position of an indication tool (for example, a pen) operated in a predetermined coordinate input region, is known. A coordinate input device, which forms a light (infrared light) layer along a display surface on the display surface on which an image is displayed, and detects the indication positions of the indication tool by detecting the positions of light reflected by the indication tool when a predetermined position on the display surface is indicated by the indication tool, is known as an example of such a coordinate input device (for example, refer to PTL 1).

The coordinate input device disclosed in PTL 1 includes an effective coordinate input region forming the display surface of a display device; multiple sensor units including a light projection unit forming the light layer along the coordinate input region, and a light receiving unit; retroreflective units which are respectively disposed on three outer sides of the effective coordinate input region, and reflect incident light; and a control/computational unit. In the coordinate input device, the multiple sensor units detect the change range of a light quantity distribution caused by the operation of the indication tool in the effective coordinate input region, and the control/computational unit calculates a coordinate value in the effective coordinate input region based on the number of change ranges and the number of pen-downs of the indication tool.

In such a coordinate input device, the light projection unit of the sensor unit includes an infrared light emitting diode (LED) emitting infrared light, and a projection lens projecting the infrared light in a range of approximately 90°. The light projection unit is fixed to an upper hood.

CITATION LIST

Patent Literature

PTL 1: Japanese Patent No. 4757144

SUMMARY OF INVENTION

Technical Problem

As described above, the coordinate input device disclosed in PTL 1 is required to form a light layer along the effective coordinate input region on the effective coordinate input region on which an image is displayed. However, in the coordinate input device disclosed in PTL 1, an emission direction of light projected from the light projection unit cannot be adjusted.

For this reason, variations in a relationship between an input surface (for example, a screen) and a light projection angle may occur due to roughness of a wall on which the light projection unit is mounted or interchange of components, and the light layer may not be able to be properly formed. A more accurate fixing of the sensor units is considered to cope with such a problem, however, in this case, there is a problem in that the mounting of the sensor units becomes complicated.

An object of the present invention is to provide a light emitting device capable of adjusting an emission direction of light, and an image display system.

Solution to Problem

A light emitting device according to a first aspect of the present invention includes: a light source unit that emits light to a region along a predetermined flat surface; a frame in which the light source unit is provided; and an adjustment mechanism that adjusts an emission direction of light emitted from the light source unit, relative to the predetermined flat surface.

According to the first aspect, since the frame is provided with the adjustment mechanism adjusting the emission direction of light emitted from the light source unit, relative to the predetermined flat surface, it is possible to adjust the inclination of the frame relative to the predetermined flat surface. As a result, it is possible to adjust the emission direction of light emitted from the light source unit provided in the frame, relative to the predetermined flat surface.

In the first aspect, the frame preferably includes a pivotal portion. The adjustment mechanism preferably adjusts the emission direction of light by adjusting the inclination of the frame around the pivotal portion relative to the predetermined flat surface.

According to the first aspect, since the frame includes the pivotal portion, the adjustment mechanism is capable of reliably adjusting the inclination of the frame around the pivotal portion relative to the predetermined flat surface. As a result, it is possible to reliably adjust the emission direction of light emitted from the light source unit provided in the frame, relative to the predetermined flat surface.

In the first aspect, the pivotal portion is preferably positioned opposite to the emission direction of light with respect to the adjustment mechanism. The adjustment mechanism preferably includes a first adjustment mechanism and a second adjustment mechanism, which are provided in a portion of the frame on the side of the emission direction of light, and are disposed while being spaced therebetween in the emission direction of light when seen from a direction perpendicular to the predetermined flat surface.

According to the first aspect, since the pivotal portion is positioned opposite to the emission direction of light with respect to the adjustment mechanism, it is possible to adjust the inclination of the frame around the pivotal portion, which is positioned opposite to the emission direction of light, relative to the predetermined flat surface via the first adjustment mechanism that is positioned at one end of the frame in the intersecting direction, and the second adjustment mechanism that is positioned at the other end. As a result, it is possible to minutely adjust the emission direction of light emitted from the light source unit provided in the frame, relative to the predetermined flat surface.

In the first aspect, at least either of the first adjustment mechanism and the second adjustment mechanism preferably includes a fixing member that is disposed along an end portion of the frame in the emission direction of light, and is fixed independently from the frame; a shaft member that is turnably provided in the fixing member; and a moving member which is engaged with the shaft member, and is moved along a central axis of the shaft member such that the frame is moved along the central axis.

According to the first aspect, when the shaft member, which is turnably provided in the fixing member fixed independently from the frame, is turned, the moving member is moved along the central axis of the shaft member such that the frame is moved along the central axis of the shaft member. Accordingly, it is possible to minutely adjust the inclination of the frame relative to the predetermined flat surface according to the turning of the shaft member. In a case where each of the first adjustment mechanism and the second adjustment mechanism has such a configuration, it is possible to more minutely adjust the inclination of the frame. As a result, it is possible to more minutely adjust the emission direction of light.

In the first aspect, the shaft member preferably includes a screwed portion that is spirally formed on a circumferential surface of the shaft member along the central axis, and is screwed to the moving member. The moving member is preferably in contact with the frame in a state where the turning of the moving member around the central axis is limited.

According to the first aspect, it is possible to reliably move the moving member in a direction along the central axis of the shaft member by the turning of the shaft member. Accordingly, it is possible to very minutely adjust the inclination of the frame relative to the predetermined flat surface. As a result, it is possible to very minutely adjust the emission direction of light relative to the predetermined flat surface.

In the first aspect, preferably, the light emitting device further includes a housing that accommodates the light source unit, the frame, and the adjustment mechanism thereinside. The fixing member is preferably fixed inside of the housing. The housing preferably includes an operation member, which is positioned outside of the housing and is turnably supported by the housing, and a transmission member, which includes a turning axis coaxial with that of the operation member and is engaged with the shaft member such that the shaft member is turned by the turning of the operation member.

According to the first aspect, the shaft portion, which is engaged with the transmission member, can be indirectly turned by turning the operation member by a user. Accordingly, it is possible to adjust the inclination of the frame accommodated inside the housing by only turning the operation member provided outside of the housing.

In a case where the shaft member is directly turned, it is considered that the frame or the fixing member may be deformed due to a load applied to the shaft member. In contrast, in the first aspect, the operation member turns the shaft member via the transmission member such that the occurrence of such a deformation can be suppressed.

In the first aspect, the housing preferably includes a cover member covering the operation member.

According to the first aspect, for example, it is possible to prevent a change in the emission direction of light, which is caused by the unintentional turning of the operation member, by covering the operation member with the cover member after ending the adjustment of the emission direction of light.

In the first aspect, the housing preferably includes a recessed portion that is positioned at the circumference of the operation member, and is formed along a turning direction of the operation member.

According to the first aspect, the recessed portion is formed at the circumference of the operation member in the housing along the turning direction of the operation member. Accordingly, a space is formed such that a user can put fingers into the space to hold the operation member. As a result, the user can easily turn the operation member along the surface of the housing on which the operation member is provided. For this reason, the user can easily transmit force to the operation member, and the inclination of the operation member relative to the surface of the housing is suppressed, and thus, it is possible to reduce a load to the operation member or the transmission member.

In the first aspect, preferably, the light emitting device further includes a shock-absorbing portion which is positioned between the housing and the frame, and, when the light emitting device falls to the ground, which comes into contact with the frame such that contact between the light source unit provided in the frame and the housing is suppressed.

According to the first aspect, in a case where the light emitting device falls to the ground, the shock-absorbing portion comes into contact with the frame such that contact between the housing and the light source unit can be prevented. Accordingly, it is possible to prevent damage to the light source unit caused by a falling impact without implementing a countermeasure against an impact to the light source unit. In this configuration, it is possible to maintain the inclination of the frame adjusted relative to the predetermined flat surface, even after the light emitting device falls to the ground.

In the first aspect, the shock-absorbing portion is preferably formed integrally with the housing.

As an example of the shock-absorbing portion, it is possible to illustrate a pin that protrudes to the frame from an inner surface of the housing on a light source unit side, and is positioned between the frame and the inner surface of the housing.

According to the first aspect, since the shock-absorbing portion is formed integrally with the housing, it is not necessary to provide a separate shock-absorbing component. As a result, it is possible to suppress the complexity of a manufacturing process of the light emitting device, and a manufacturing cost increase.

Either of a protruding shape and a recessed shape can be adopted as the shape of a tip portion (portion coming into contact with the frame) of the shock-absorbing portion. In a case where a recessed shape is adopted, it is possible to more effectively absorb the impact.

An image display system according to a second aspect of the present invention includes: a display device that displays a received image; the light emitting device which emits light to a region along a display surface on which the image is displayed by the display device, and forms a light layer along the display surface; a detection device that detects the reflected positions of light, which is emitted from the light emitting device, in the region; and an image generation device that generates an image according to a detected result obtained by the detection device, and transmits the image to the display device.

According to the second aspect, it is possible to obtain the same effects as those of the light emitting device of the first aspect.

Since light, which is emitted from the light emitting device in the predetermined range, can be properly aligned along the display surface, it is possible to reduce the distance between a light layer and the display surface to a relatively small value. For this reason, a user can easily perform an operation (for example, a double click operation) of continuously indicating a predetermined portion in an image displayed on the display surface with an indication tool reflecting light emitted from the light emitting device, that is, an operation of continuously inserting into and removing the indication tool from the light layer. As a result, the operability of the image display system can be improved.

DESCRIPTION OF EMBODIMENTS

Hereinafter, an embodiment of the present invention will be described with reference to the accompanying drawings.
[Configuration of Image Display System]

Figure 1:
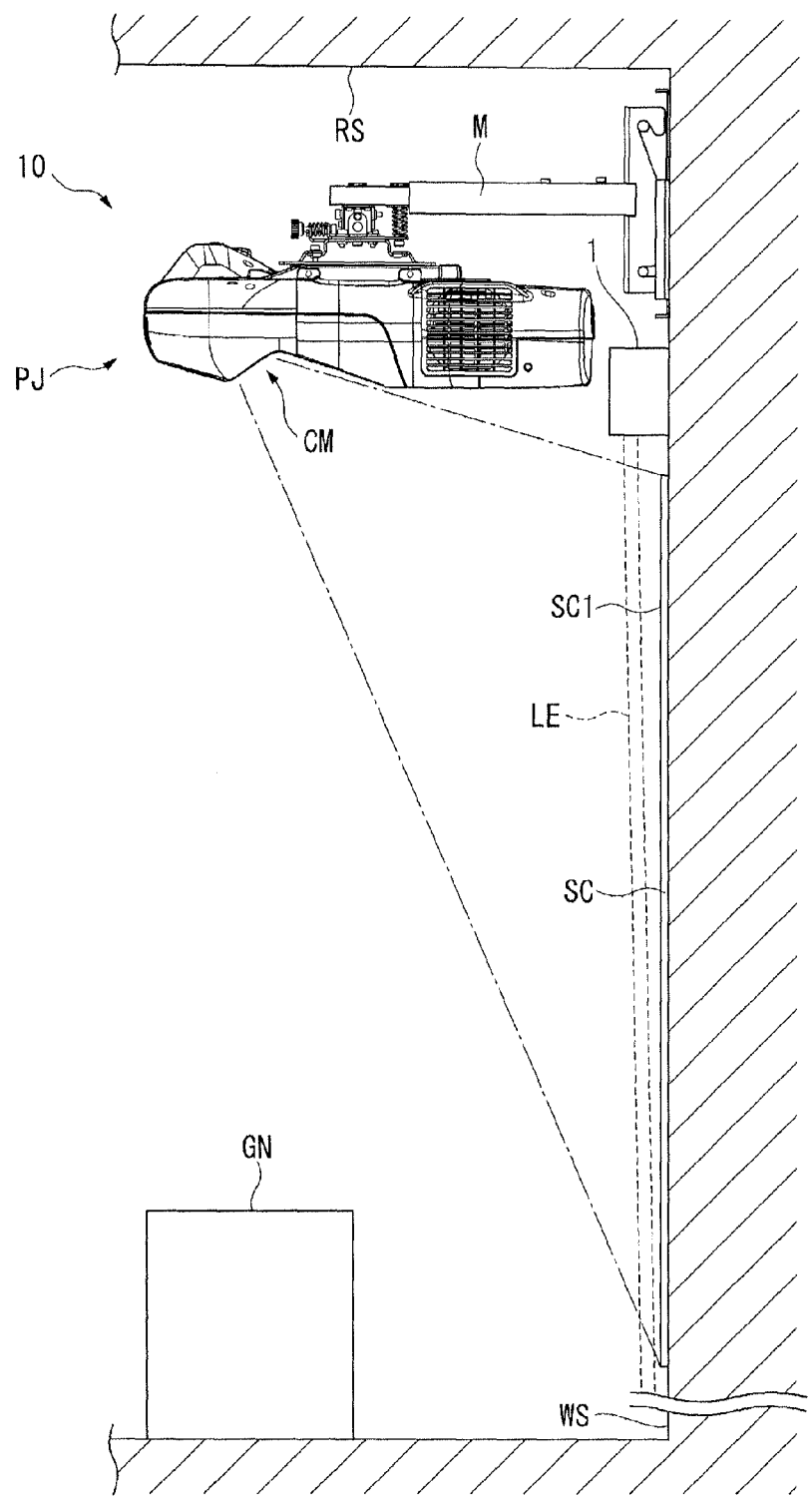
FIG. 1 is a view illustrating the configuration and the state of use of an image display system in an embodiment of the present invention.

FIG. 1 is a view illustrating the configuration and the state of use of an image display system 10 in the embodiment.

As illustrated in FIG. 1, the image display system 10 in the embodiment includes a light emitting device 1; a projector PJ; a screen SC; and an image generation device GN (not illustrated). In the image display system 10, the light emitting device 1 forms a light layer along the screen SC by emitting light (infrared light in the embodiment) along the screen SC. The projector PJ projects an image, which is received from the image generation device GN, onto the screen SC which is a projection surface (display surface), and displays the image thereon in a visible manner. In addition, the projector PJ includes an image capturing device capturing an image of an imaging region containing an image display region on the screen SC, and transmits a captured image, which is obtained by the image capturing device, to the image generation device GN. The image generation device GN analyzes the reflected positions of light (the indication positions of a finger, an indication tool, or the like), which is emitted from the light emitting device 1 and is reflected by a finger of a user or an indication tool, in the image display region based on the captured image. The image generation device GN generates an image, in which the reflected positions are illustrated by dots or lines, based on a result of the analysis, and transmits the image to the projector PJ. Accordingly, in the image display system 10 of the embodiment, an image containing the locus of the finger or the indication tool on the screen SC is displayed on the screen SC.

Hereinafter, the configuration of the image display system 10 will be described.

The light emitting device 1 has a function of forming a light layer along a predetermined flat surface.

In the embodiment, as illustrated in FIG. 1, the light emitting device 1 is provided on a wall surface WS on which the screen SC is installed. Accordingly, the light emitting device 1 forms a light layer in a region (interactive region LE) along the screen SC which is a predetermined flat surface.

The specific configuration of the light emitting device 1 will be described later.
[Configuration of Projector]

The projector PJ is suspended from a suspension metal fixture M fixed to the wall surface WS, and is provided close to a ceiling surface RS. The projector PJ serves as an image display device that modulates light emitted from a light source device provided inside of the image display device, forms an image according to image information received from the image generation device GN, and magnifies and projects the formed image onto a projection surface SC1 of the screen SC.

In addition, the projector PJ includes an image capturing device CM capturing an image of an imaging region containing the range (image display range) of projection of an image onto the projection surface SC1, and transmits a captured image, which is obtained by the image capturing device, to the image generation device GN. The image capturing device CM forms a detection device of the present invention along with the image generation device GN.
[Configuration of Image Generation Device]

The image generation device GN is formed of a personal computer (PC) and the like. The image generation device GN acquires the captured image transmitted from the projector PJ, and detects the reflected positions of the light in the captured image which is acquired. It is possible to know the range of the image display region in the captured image in advance by performing calibration. For this reason, it is possible to acquire the coordinates of the indication positions of the indication tool or the like on the projection surface SC1 by detecting the reflected positions.

The image generation device GN generates an image in which the acquired indication positions are illustrated by dots or lines. The image generated in this manner is transmitted to the projector PJ.
[Configuration of Light Emitting Device]

Hereinafter, the specific configuration of the light emitting device will be described.

Figure 2:
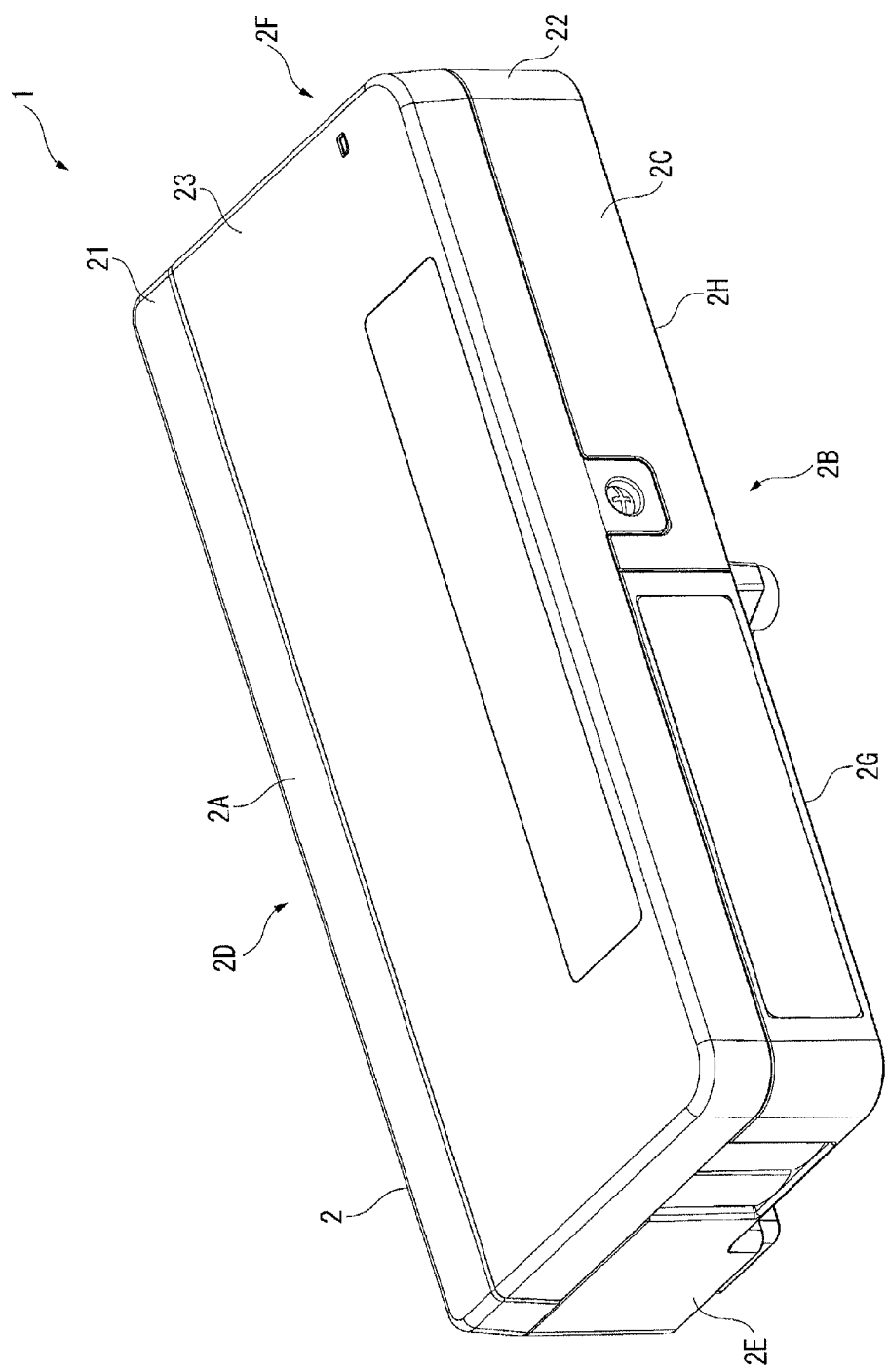
FIG. 2 is a perspective view illustrating a light emitting device in the embodiment.
Figure 3:
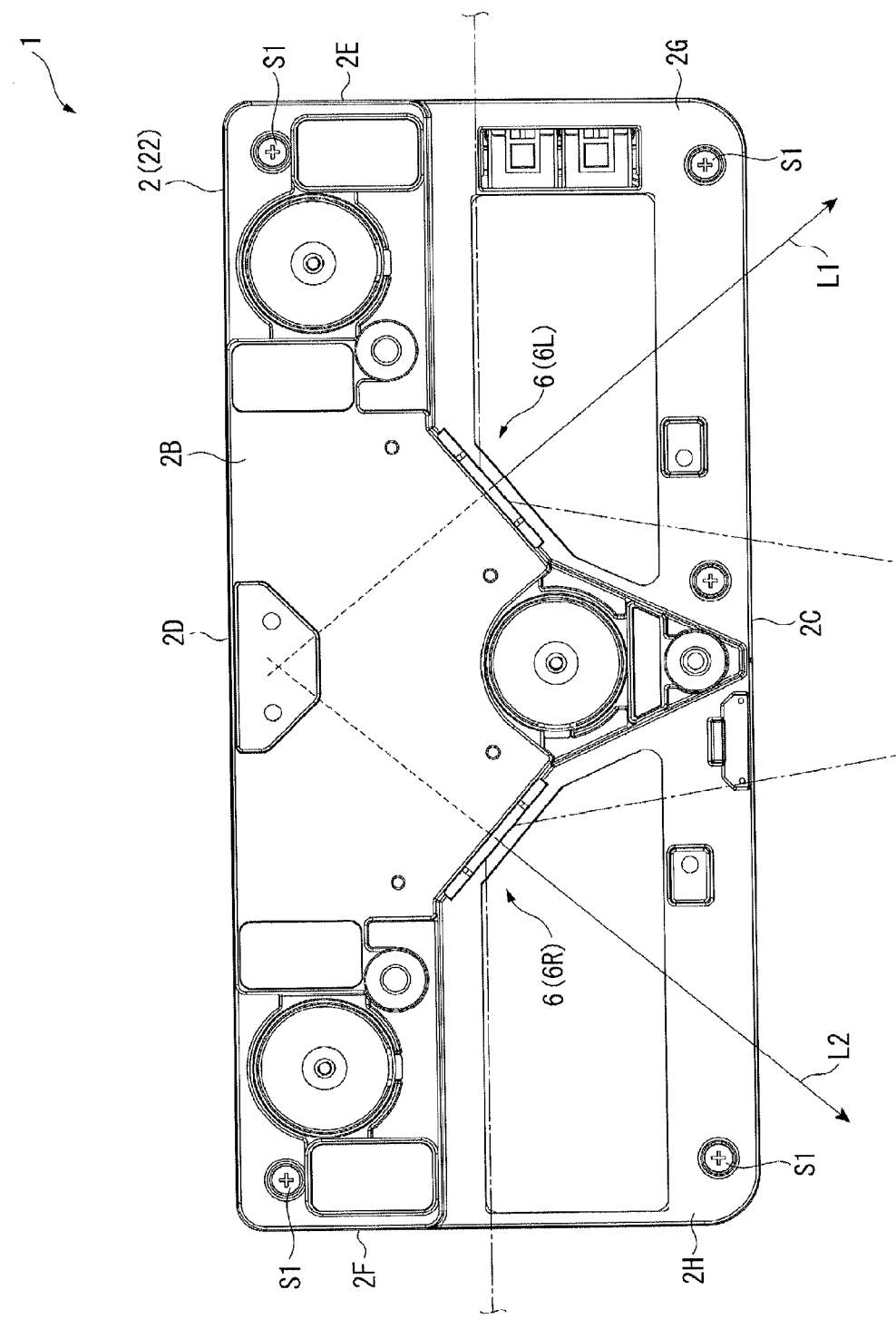
FIG. 3 is a view illustrating a bottom surface portion of the light emitting device in the embodiment.

FIG. 2 is a perspective view of the light emitting device 1, and FIG. 3 is a view illustrating a bottom surface portion of the light emitting device 1.

As illustrated in FIGS. 2 and 3, the light emitting device 1 includes a housing 2 that accommodates a device body 3 (to be described later) inside thereof.

As illustrated in FIG. 2, the housing 2 includes a bottom surface portion 2B; a top surface portion 2A; a front surface portion 2C; a back surface portion 2D; a left surface portion 2E; and a right surface portion 2F. Among these surface portions, the bottom surface portion 2B faces the wall surface WS when the light emitting device 1 is installed on the wall surface WS (refer to FIG. 1). The top surface portion 2A is positioned opposite to the bottom surface portion 2B. The front surface portion 2C is positioned to an emission direction of light emitted from a light source unit 6 (to be described later). The back surface portion 2D is positioned opposite to the front surface portion 2C. When facing the front surface portion 2C so that the top surface portion 2A is positioned on an upper side, the left surface portion 2E is positioned on a left side, and the right surface portion 2F is positioned on a right side.

The housing 2 is configured to include an upper case 21; a lower case 22; and a cover 23.

The upper case 21 forms a portion of each of the top surface portion 2A, the front surface portion 2C, the back surface portion 2D, the left surface portion 2E, and the right surface portion 2F. The lower case 22 forms a portion of each of the bottom surface portion 2B, the front surface portion 2C, the back surface portion 2D, the left surface portion 2E, and the right surface portion 2F.

A left recessed portion 2G which is formed across the bottom surface portion 2B, the front surface portion 2C, and the left surface portion 2E, and a right recessed portion 2H which is formed across the bottom surface portion 2B, the front surface portion 2C, and the right surface portion 2F, are formed in the lower case 22 among these cases.

The cover 23 is mounted on the upper case 21, and covers a dial 211 (refer to FIGS. 4 and 5) that is provided as an operation member on the upper case 21.

As illustrated in FIG. 3, the bottom surface portion 2B includes a hole portion (not illustrated) at each corner. A screw S1 is fitted into each hole portion. The screws S1 are inserted into the top surface portion 2A such that the lower case 22 is screw-fixed to the upper case 21.

Specifically, a first light source unit 6L (refer to FIGS. 8 and 9) of the light source unit 6 (to be described later) is exposed inside of the left recessed portion 2G (to be described later). The first light source unit 6L diffuses and emits light to a range defined by alternate long and short dash lines with an L1 direction being centered in FIG. 3.

A second light source unit 6R (refer to FIGS. 6 and 7) of the light source unit 6 (to be described later) is exposed inside of the right recessed portion 2H. The second light source unit 6R diffuses and emits light to a range defined by alternate long and short dash lines with an L2 direction being centered in FIG. 3.

A portion of light layers (light layers formed in the ranges defined by the alternate long and short dash lines) formed by the first light source unit 6L and the second light source unit 6R overlap each other. The entire projection surface SC1 (refer to FIG. 1) is covered with the light layers.

Figure 4:
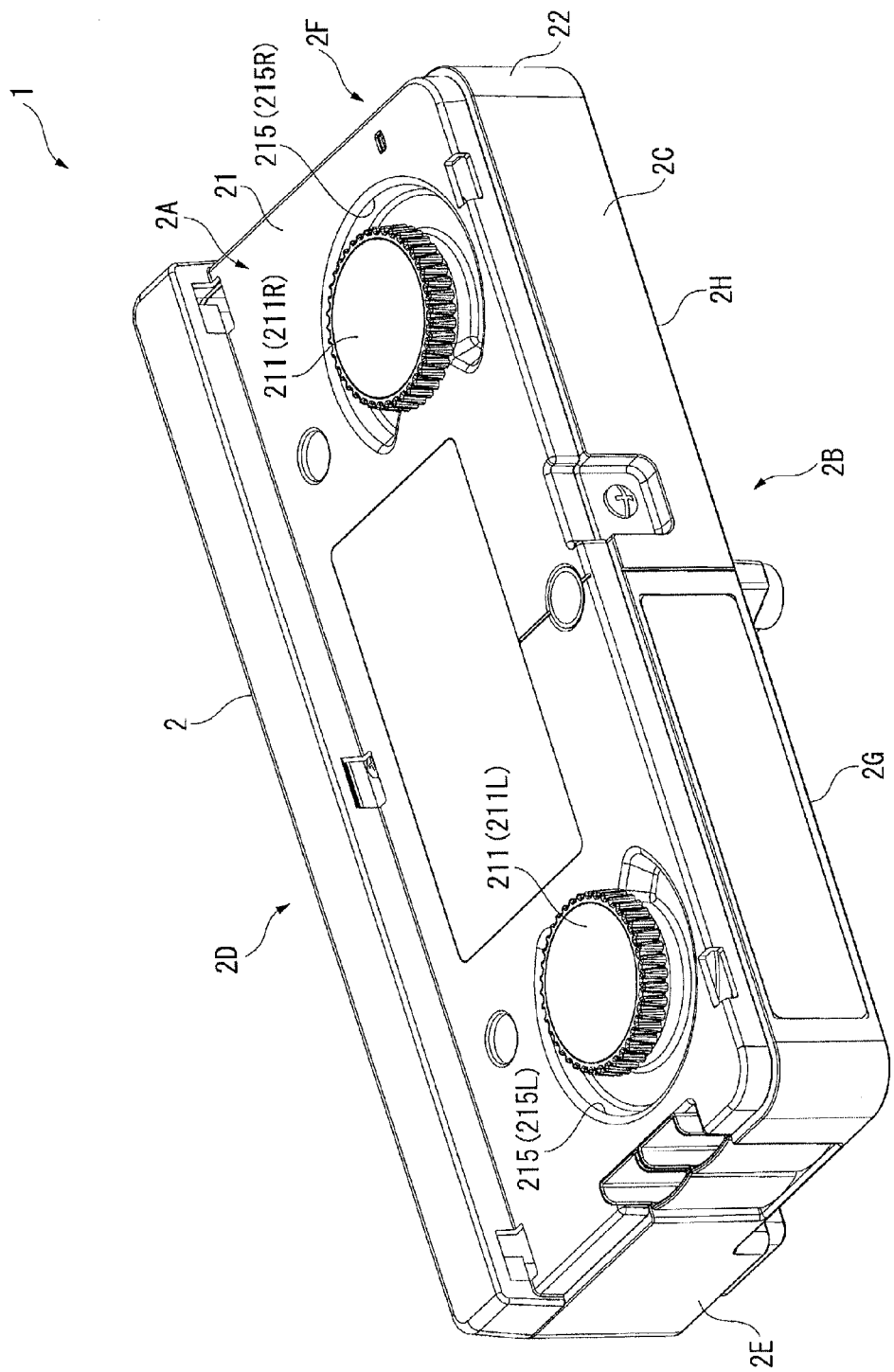
FIG. 4 is a perspective view illustrating the exterior of the light emitting device in the embodiment from which a cover is detached.
Figure 5:
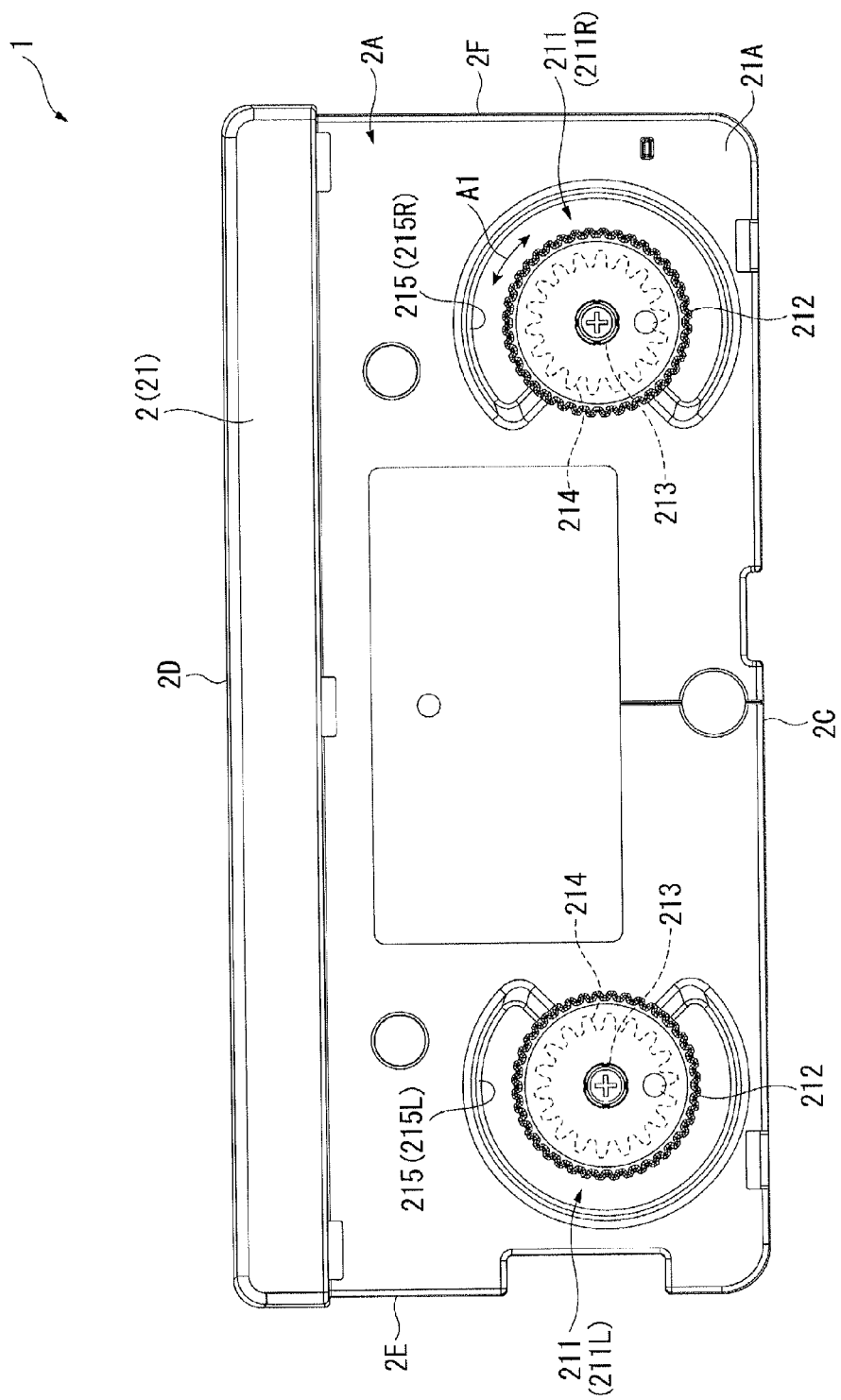
FIG. 5 is a top view illustrating the external surface of an upper case in the embodiment.

FIG. 4 is a perspective view illustrating the light emitting device 1 from which the cover 23 is detached. FIG. 5 is a top view illustrating the light emitting device 1 from which the cover 23 is detached.

As illustrated in FIGS. 4 and 5, in a case where the cover 23 is detached from the upper case 21 on which the cover 23 is attachably and detachably provided, two dials 211 and two recessed portions 215, which are positioned on an external surface 21A (that is, the top surface portion 2A) of the upper case 21, are exposed.

The dials 211 (211R and 211L represent the dials which are respectively positioned on a right surface portion 2F side and a left surface portion 2E side) correspond to the operation members of the present invention, and are turnably supported by the top surface portion 2A. As illustrated in FIG. 5, each of the dials 211 includes a body portion 212; a shaft portion 213; and a gear 214.

The body portion 212 is formed into a substantially cylindrical shape, and is positioned outside of the housing 2. The body portion 212 is a portion held by a user to turn the dial 211. Recesses and protrusions are formed on a side surface of the body portion 212.

The shaft portion 213 is a bar-shaped member screw-fixed to a substantially central portion of the body portion 212. The shaft portion 213 is inserted into a hole (not illustrated) formed in the top surface portion 2A.

The gear 214 is positioned inside of the housing 2, and is fixed to the shaft portion 213 such that the gear 214 is positioned opposite to the body portion 212. The gear 214 is turned around the shaft portion (serving as the axis of turning) 213 along with the body portion 212. In other words, when the body portion 212 is turned in either direction, the gear 214, which is connected to the body portion 212 via the shaft portion 213, is turned in the same turning direction as that of the body portion 212. The gear 214 meshes with a gear 721 of an adjustment mechanism 7 (to be described later), and turns the gear 721. That is, the gear 214 corresponds to a transmission member of the present invention.

The recessed portions 215 (215R and 215L represent the recessed portions which are respectively positioned on the right surface portion 2F side and the left surface portion 2E side) are positioned at the circumferences of the corresponding dials 211 (the body portions 212). Each of the recessed portions 215 is formed into a circular arc shape along the turning direction of the dial 211. The recessed portion 215 is formed to have a depth such that a portion of a finger of a user operating the body portion 212 can be inserted into the recessed portion 215.

[Configuration of Device Body]

Figure 6:
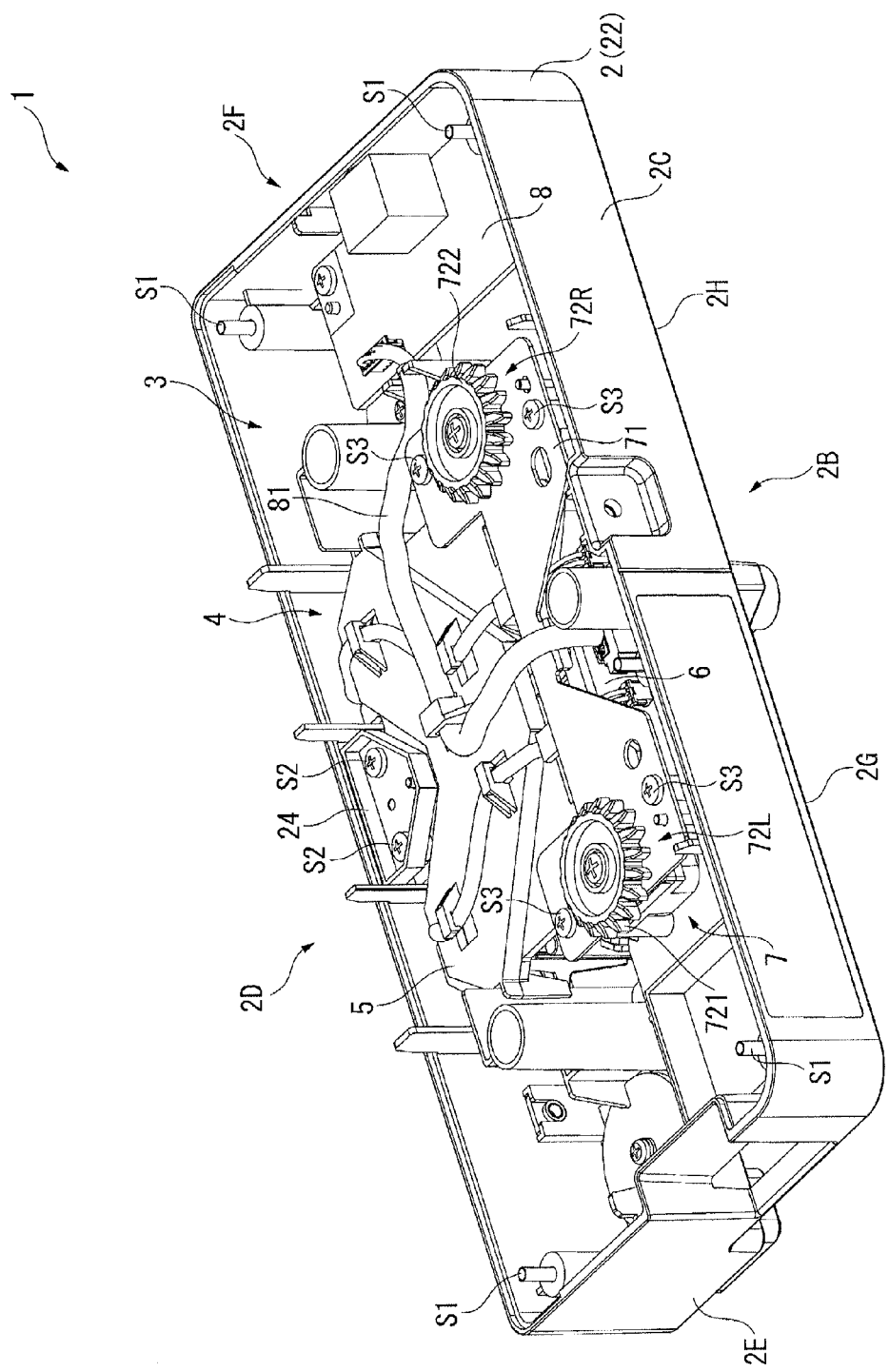
FIG. 6 is a perspective view illustrating the exterior of the light emitting device in the embodiment from which the upper case is detached.
Figure 7:
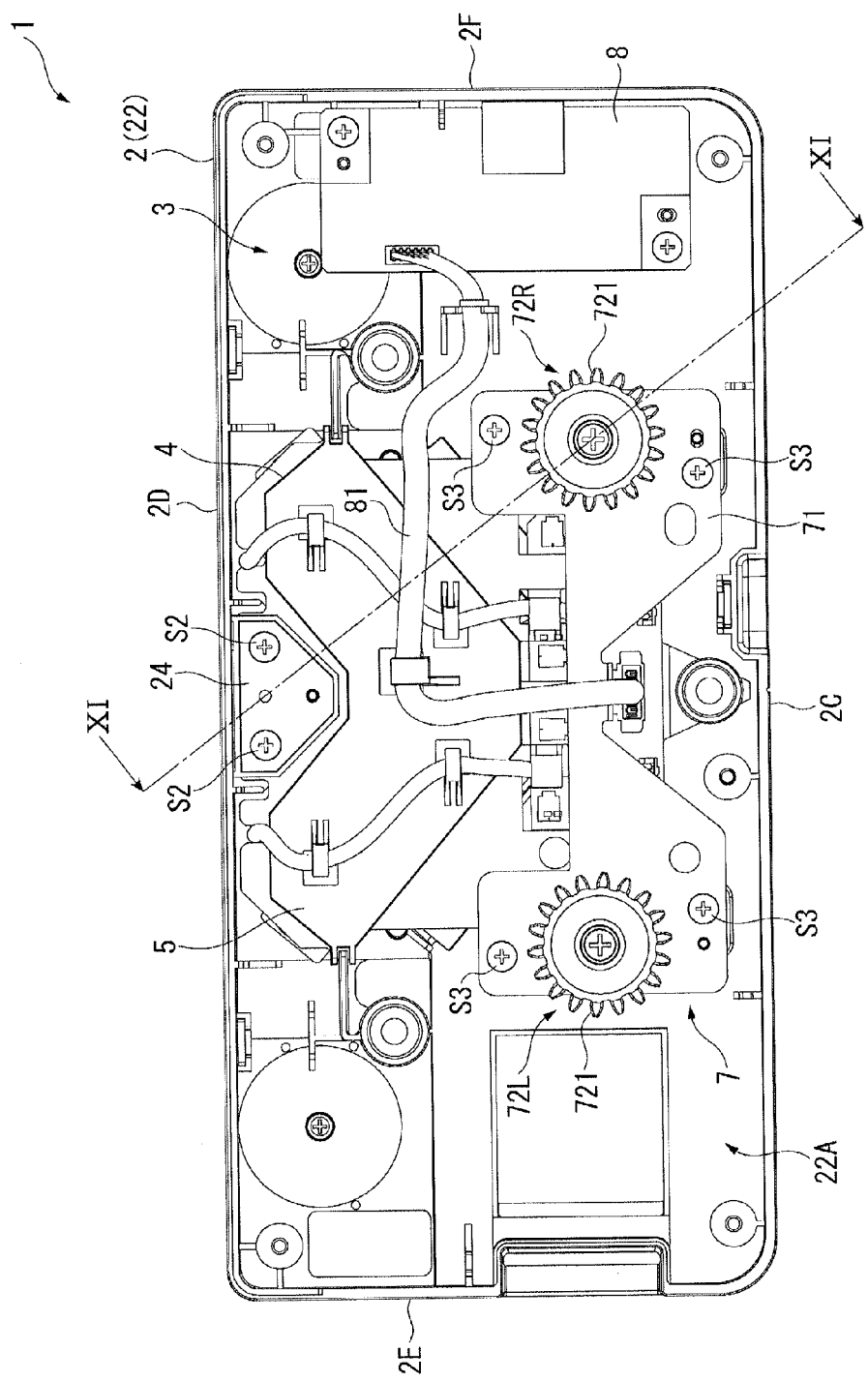
FIG. 7 is a top view illustrating the light emitting device in the embodiment from which the upper case is detached.

FIG. 6 is a perspective view illustrating the light emitting device 1 from which the upper case 21 is detached, when seen from a top surface side and a front surface side. FIG. 7 is a top view illustrating a state in which the upper case 21 is detached from the light emitting device 1.

As illustrated in FIGS. 6 and 7, the device body 3 includes a light curtain unit 4 and a substrate 8, and they are fixed to an inner surface of the lower case 22.

The substrate 8 of these components is a control substrate that supplies electric power to the light curtain unit 4, and controls the light curtain unit 4. The substrate 8 is electrically connected to the light curtain unit 4 via a cable 81.

[Configuration of Light Curtain Unit]

Figure 8:
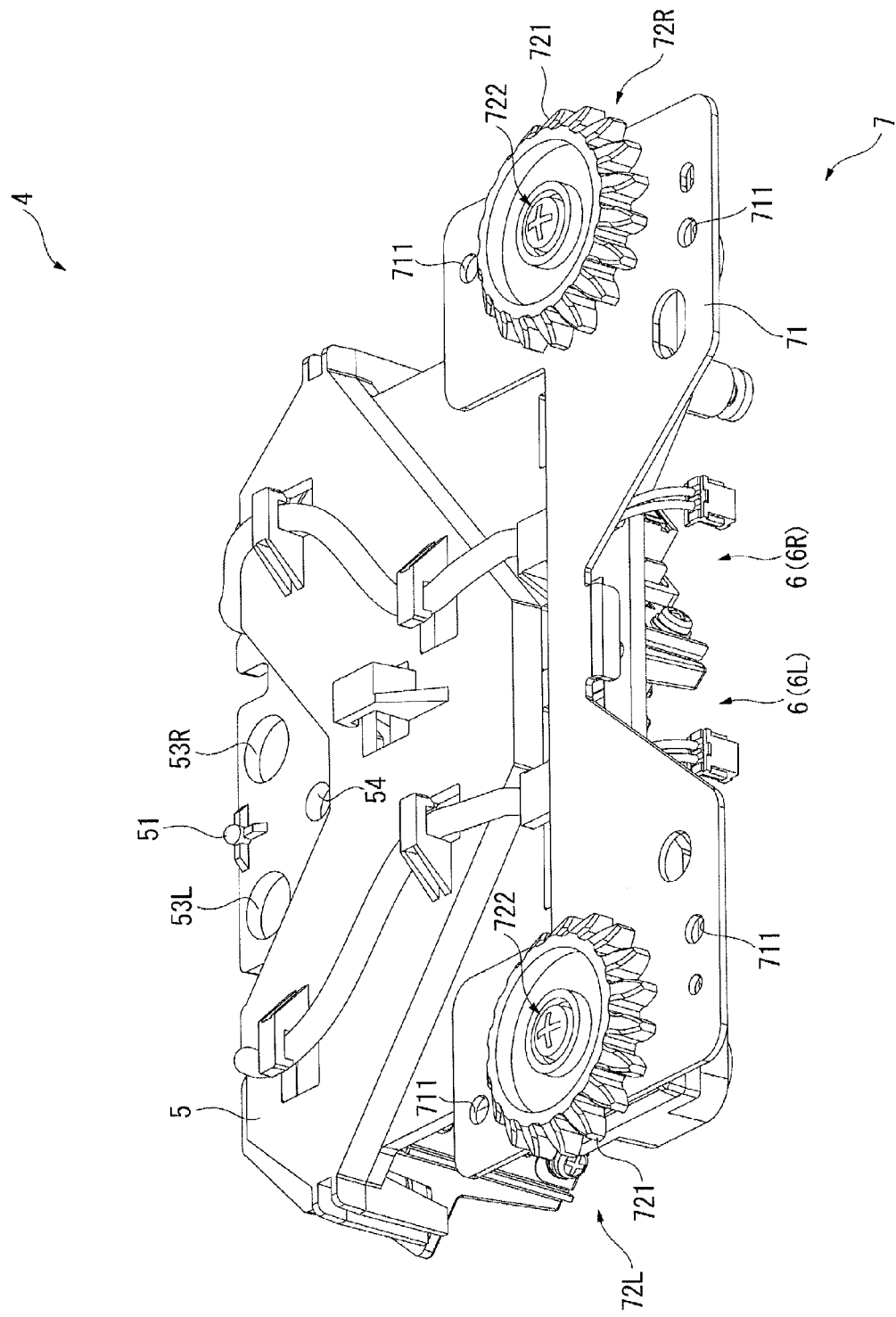
FIG. 8 is a perspective view illustrating a light curtain unit in the embodiment.
Figure 9:
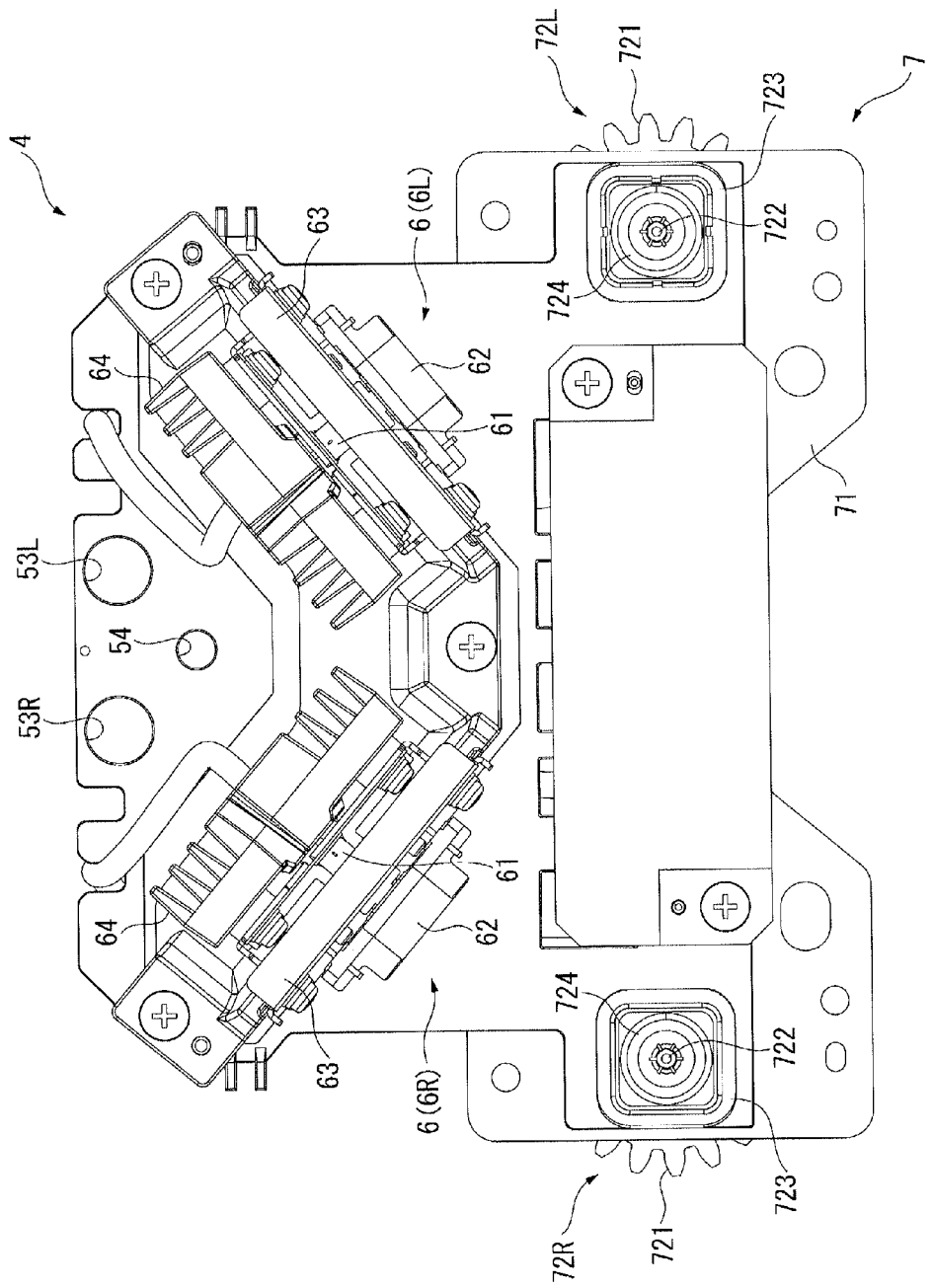
FIG. 9 is a view of the light curtain unit in the embodiment when seen from a bottom surface side.

FIG. 8 is a perspective view of the light curtain unit 4 when seen from the top surface side and the front surface side. FIG. 9 is a view of the light curtain unit 4 when seen from a bottom surface side.

The light curtain unit 4 has a function of forming light layers (light curtains) by emitting light in the range along the projection surface SC1, and has a function of adjusting an emission direction of the light. As illustrated in FIGS. 6 to 9, the light curtain unit 4 includes a frame 5; the light source unit 6 emitting light; and the adjustment mechanism 7 that adjusts an emission direction of light emitted from the light source unit 6 by adjusting the inclination of the frame 5 relative to the projection surface SC1.

[Configuration of Frame]

The frame 5 is a flat plate-shaped metal member, and supports the light source unit 6 and the adjustment mechanism 7. Specifically, the light source unit 6 is disposed on a surface of the frame 5 which faces a bottom surface 22A (refer to FIGS. 6 and 7) of the lower case 22. The adjustment mechanism 7 is disposed in the vicinities (in the vicinity of left surface portion 2E-side and right surface portion 2F-side end portions) of both ends of a front surface portion 2C-side end portion of the frame 5 (refer to FIGS. 6 and 7).

As illustrated in FIG. 8, the frame 5 includes a pivotal portion 51, and hole portions 53R, 53L, and 54 which are positioned at the circumference of the pivotal portion 51.

The pivotal portion 51 is disposed in the vicinity of an end portion (that is, on aback surface 2D side) of a surface which faces the upper case 21 and is positioned opposite to the emission direction of light emitted from the light source unit 6. A tip of the pivotal portion 51 is formed into a substantially hemispherical shape. The pivotal portion 51 serves as a pivot (the center of turning) of the frame 5 when the inclination (emission direction of light) of the frame 5 is adjusted by the adjustment mechanism 7 (to be described later). In the embodiment, the pivotal portion 51 is disposed in a portion in which an extension line on the L1 direction and an extension line on the L2 direction intersect each other (refer to FIG. 3).

As illustrated in FIGS. 6 and 7, a pressing member 24 is disposed inside of the lower case 22, and presses the frame 5 disposed inside of the lower case 22. Specifically, the pressing member 24 is provided at a position corresponding to the pivotal portion 51. A tip portion of the pivotal portion 51 is in contact with a surface of the pressing member 24 which faces the frame 5. The pressing member 24 is fixed to the lower case 22 with a screw S2 inserted into the pressing member 24 and the hole portion 53L, and with a screw S2 inserted into the pressing member 24 and the hole portion 53R.

[Configuration of Light Source Unit]

As described above, the light source unit 6 is mounted on a lower case 22 side of the frame 5. The light source 6 includes the first light source unit 6L positioned on a left surface portion 2E side of the frame 5, and the second light source unit 6R positioned on a right surface portion 2F side.

The first light source unit 6L and the second light source unit 6R emit light in the range along the projection surface SC1 which is the predetermined flat surface. Specifically, the first light source unit 6L forms a substantially uniform light layer at a predetermined angle in relation to the L1 direction which is centered (refer to FIG. 3). The second light source unit 6R forms substantially uniform light layer at a predetermined angle in relation to the L2 direction which is centered (refer to FIG. 3). The light layer formed by the first light source unit 6L and the light layer formed by the second light source unit 6R overlap each other at the center of the projection surface SC1, and each of the light layers covers the entire project surface SC1. These light layers form the interactive region LE.

As illustrated in FIG. 9, each of the first light source unit 6L and the second light source unit 6R includes a solid light source 61; an optical device 62; a support member 63; and a heat sink 64.

In the embodiment, the solid light source 61 a laser diode (LID) emitting infrared light. The turning on and off of the solid light source 61 is controlled by the substrate 8.

The optical device 62 diffuses and emits the light, which is emitted from the solid light source 61, along the projection surface SC1. The optical device 62 includes a collimating lens and a Powell lens, which are not illustrated. The Powell lens of these lenses uniformly diffuses and emits light, which is emitted from the solid light source 61 and is collimated by the collimating lens, in a predetermined range along the projection surface SC1.

The support member 63 supports the optical device 62, and is fixed to the frame 5.

The heat sink 64 is disposed opposite to the emission direction of light emitted from the solid light source 61. The heat sink 64 is thermally conductively connected to the solid light source 61, and radiates heat conducted from the solid light source 61 such that the solid light source 61 is cooled.

Herein, the position of the light source unit 6 in the lower case 22 will be described.

Figure 10:
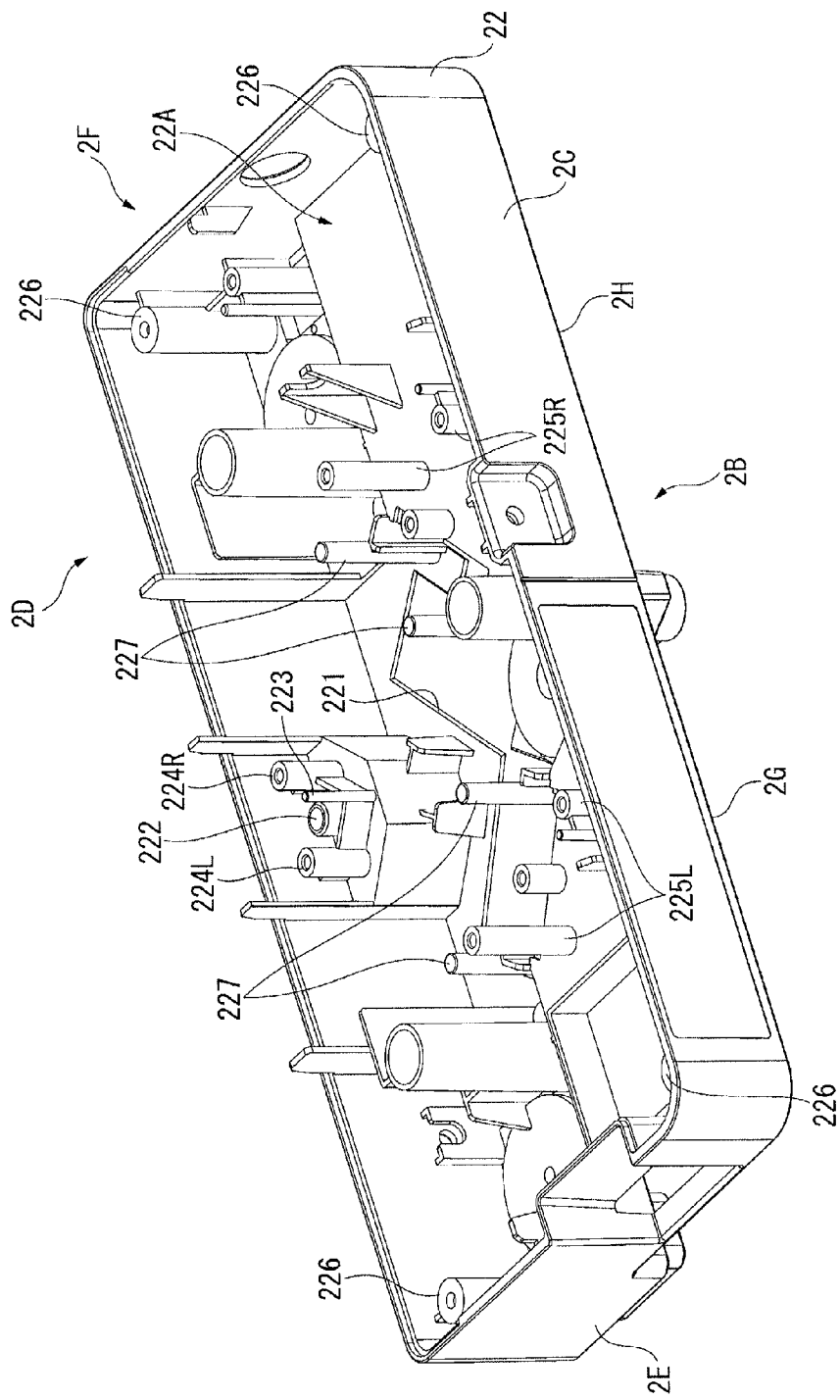
FIG. 10 is a perspective view illustrating a lower case in the embodiment.

FIG. 10 is a perspective view of the lower case 22 when seen from the top surface side and the front surface side. That is, FIG. 10 is a perspective view illustrating the lower case 22 in a state where the device body 3 is detached from the light emitting device 1 in FIG. 6.

As illustrated in FIG. 10, the lower case 22 includes an opening portion 221.

The opening portion 221 is formed in the bottom surface of the lower case 22 so as to correspond to the shape of the light source unit 6. In a case where the light curtain unit 4 is mounted on the lower case 22, the light source unit 6 is exposed on a bottom surface portion 2B side via the opening portion 221. In this state, the first light source unit 6L is positioned inside of the left recessed portion 2G, the second light source unit 6R is positioned inside of the right recessed portion 2H, and as described above, the light source units 6R and 6L emit light along the projection surface SC1.

The lower case 22 further includes a protrusion 222; a positioning pin 223; bosses 224R, 224L, 225R, 225L, and 226; and pins 227.

The protrusion 222 protrudes from the bottom surface 22A of the lower case 22. A spring member 228 (refer to FIG. 11), which is a biasing member, is fitted onto the protrusion 222. The spring member 228 is in contact with the bottom surface 22A and a bottom surface portion 2B-side surface of the frame 5 such that the frame 5 is biased to the pressing member 24, which will be described in detail later.

The positioning pin 223 is inserted into the hole portion 54, and positions the light curtain unit 4 (the frame 5) with respect to the lower case 22.

Each of the bosses 224R and 224L includes a hole into which the screw S2 for fixing the pressing member 24 is screwed, and the pressing member 24 is fixed to the lower case 22 with the frame 5 interposed between the pressing member 24 and the lower case 22.

The bosses 226 respectively protrude at four corners of the bottom surface 22A, and the screws S1 are respectively inserted into the bosses 226 from the bottom surface portion 2B side. As described above, the screws S1 are screwed to the upper case 21.

Multiple pins 227 protrude in the vicinity of a front surface portion 2C side of the opening portion 221 such that the multiple pins 227 extend straightly from the bottom surface 22A to the top surface portion 2A side. Specifically, one pin 227 is respectively disposed in the vicinities of both front surface portion 2C-side ends of one side edge of front surface portion 2C-side end edges of the opening portion 221 having a substantially L shape, and one pin 227 is respectively disposed in the vicinities of both front surface portion 2C-side ends of the other side edge, that is, a total of four pins 227 is disposed. The pins 227 serve as shock-absorbing portions of the present invention which are positioned between the bottom surface 22A and the frame 5 when the light curtain unit 4 is accommodated inside the housing 2, and come into contact with the frame 5 (specifically, a surface of the frame 5 on which the light source unit 6 is disposed), and suppress contact between the light source unit 6 and the bottom surface 22A when the light emitting device 1 falls to the ground. The pins 227 are formed integrally with the lower case 22. In the embodiment, the pins 227 are formed at the same time the lower case 22 is molded by injection molding or the like.

In the embodiment, a tip surface (an upper case 21-side surface) of each of the pins 227 is formed into a flat shape. However, the shape of the tip surface is not limited to that shape, and the tip surface may have a protruding shape such as a hemispherical shape, or a recessed shape.

[Configuration of Adjustment Mechanism]

As illustrated in FIGS. 6 to 9, the adjustment mechanism 7 is disposed in a portion of the frame 5 on the emission direction side (the front surface portion 2C side) of light emitted from the light source unit 6, and adjusts the inclination of the frame 5 relative to the projection surface SC1. The adjustment mechanism 7 includes a fixing member 71 disposed along the front surface portion 2C-side end portion (end portion on the side of the emission direction of light emitted from the light source unit 6) of the frame 5; a first adjustment mechanism 72L positioned on a left surface portion 2E side of the end portion; and a second adjustment mechanism 72R positioned on a right surface portion 2F side. That is, the adjustment mechanism 7 includes the first adjustment mechanism 72L and the second adjustment mechanism 72R which are disposed while being spaced therebetween by a predetermined gap in a direction in which light emitted from the light source unit 6 is diffused, when the frame 5 is seen in a direction perpendicular to the projection surface SC1.

[Configuration of Fixing Member]

The fixing member 71 is fixed to the lower case 22 such that a portion of the fixing member 71 covers the front surface portion 2C-side end portion of the frame 5. Multiple hole portions 711 are formed on a right surface portion 2F side and a left surface portion 2E side of the fixing member 71. Screws S3 (refer to FIG. 6) fixed to the bosses 225R and 225L of the lower case 22 are respectively fitted into the hole portions 711 such that the fixing member 71 is screw-fixed to the lower case 22. That is, the fixing member 71 is fixed to the lower case 22, independently from the frame 5.

[Configuration of First Adjustment Mechanism and Second Adjustment Mechanism]

Figure 11:
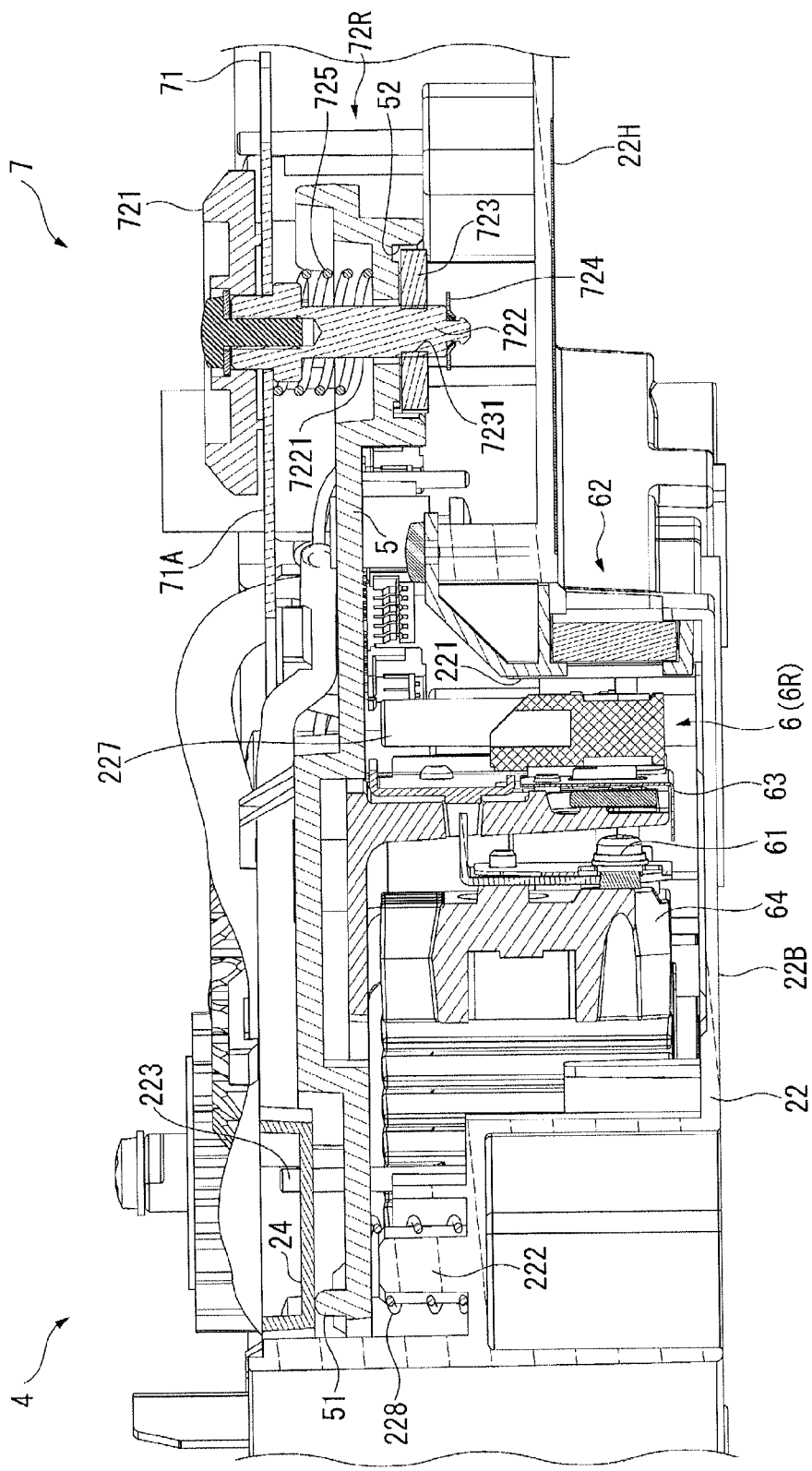
FIG. 11 is a sectional view of the light emitting device in the embodiment before an emission direction of light emitted from a light source unit is adjusted.

FIG. 11 is a vertical sectional view illustrating the lower case 22 and the second adjustment mechanism 72R. In other words, FIG. 11 is a sectional view taken along line XI-XI in FIG. 7.

As illustrated in FIGS. 8, 9, and 11, each of the first adjustment mechanism 72L and the second adjustment mechanism 72R includes the gear 721; a shaft member 722 (refer to FIGS. 9 and 11); a moving member 723 (refer to FIGS. 9 and 11).

The gear 721 is disposed on a surface 71A of the fixing member 71 which is positioned on an upper case 21 side, and is mounted in such a way as to be capable of being turned around the shaft member 722 which serves as a central axis. The gear 721 of the first adjustment mechanism 72L meshes with the gear 214 of the dial 211L. The gear 721 of the second adjustment mechanism 72R meshes with the gear 214 of the dial 211R.

The shaft member 722 is screw-fixed to a substantially central portion of the gear 721 along a central axis of the gear 721. An end portion of the shaft member 722 opposite to the gear 721 passes through the fixing member 71 and the frame 5.

The moving member 723 is provided in an end portion of the shaft member 722 which passes through the frame 5. That is, the moving member 723 is positioned on the lower case 22 side (the bottom surface portion 2B side) of the frame 5. When the gear 721 is turned, the moving member 723 is moved along the central axis of the shaft member 722.

Specifically, as illustrated in FIG. 11, the shaft member 722 includes a screwed portion 7221 that is spirally formed on a circumferential surface of the shaft member 722 along the central axis of the shaft member 722. The moving member 723 is screwed to the screwed portion 7221 via a screwed groove 7231 that is formed in an inner surface of a hole portion positioned at the center of the moving member 723. The moving member 723 is fitted into a fitting portion 52 formed in the frame 5 such that the moving member 723 is in contact with the frame 5 while the turning of the moving member 723 around the central axis of the shaft member 722 is limited. Accordingly, when one of the dials 211 is turned, and the gear 721 meshing with the gear 214 of the dial 211 is turned in either direction, the shaft member 722 is turned according to the turning of the gear 721. As the shaft member 722 is turned, the moving member 723 is moved to the top surface portion 2A side or the bottom surface portion 2B side, that is, along the shaft member 722.

A disengagement prevention member 724 is mounted in the vicinity of a tip portion (bottom surface portion 2B-side end portion) of the shaft member 722, and prevents disengagement of the moving member 723 from the shaft member 722.

A spring member 725 formed of a compression coil spring is disposed at the circumference of the shaft member 722 such that a central axis of the spring member 725 substantially coincides with the shaft member 722. One end of the spring member 725 is in contact with the fixing member 71, and the other end is in contact with the frame 5. For this reason, the spring member 725 presses and biases the frame 5 against the moving member 723, and thus, the frame 5 can be reliably moved along the central axis of the shaft member 722 according to the movement of the moving member 723.

[Adjustment of Emission Direction Performed by Adjustment Mechanism]

Hereinafter, a method of adjusting the emission direction of light emitted from the light source unit 6 via the adjustment mechanism 7 will be described. In the following case, the dial 211R is operated. The method of adjusting the emission direction by operating the dial 211L (refer to FIGS. 4 and 5) is substantially the same as that by operating the dial 211R (refer to FIGS. 4 and 5).

In a state illustrated in FIG. 11, the frame 5 is disposed parallel with the bottom surface 22A of the lower case 22. In this state, the frame 5 is biased to the top surface portion 2A side by the spring member 228, and the tip portion of the pivotal portion 51 is in contact with a bottom surface portion 2B-side surface of the pressing member 24. In contrast, the protrusion 222 is not in direct contact with the frame 5. For this reason, the frame 5 is disposed inside of the lower case 22 while having a certain degree of freedom between the protrusion 222 and the pressing member 24. As a result, the frame 5 is capable of inclining around the pivotal portion 51 by the adjustment mechanism 7.

Figure 12:
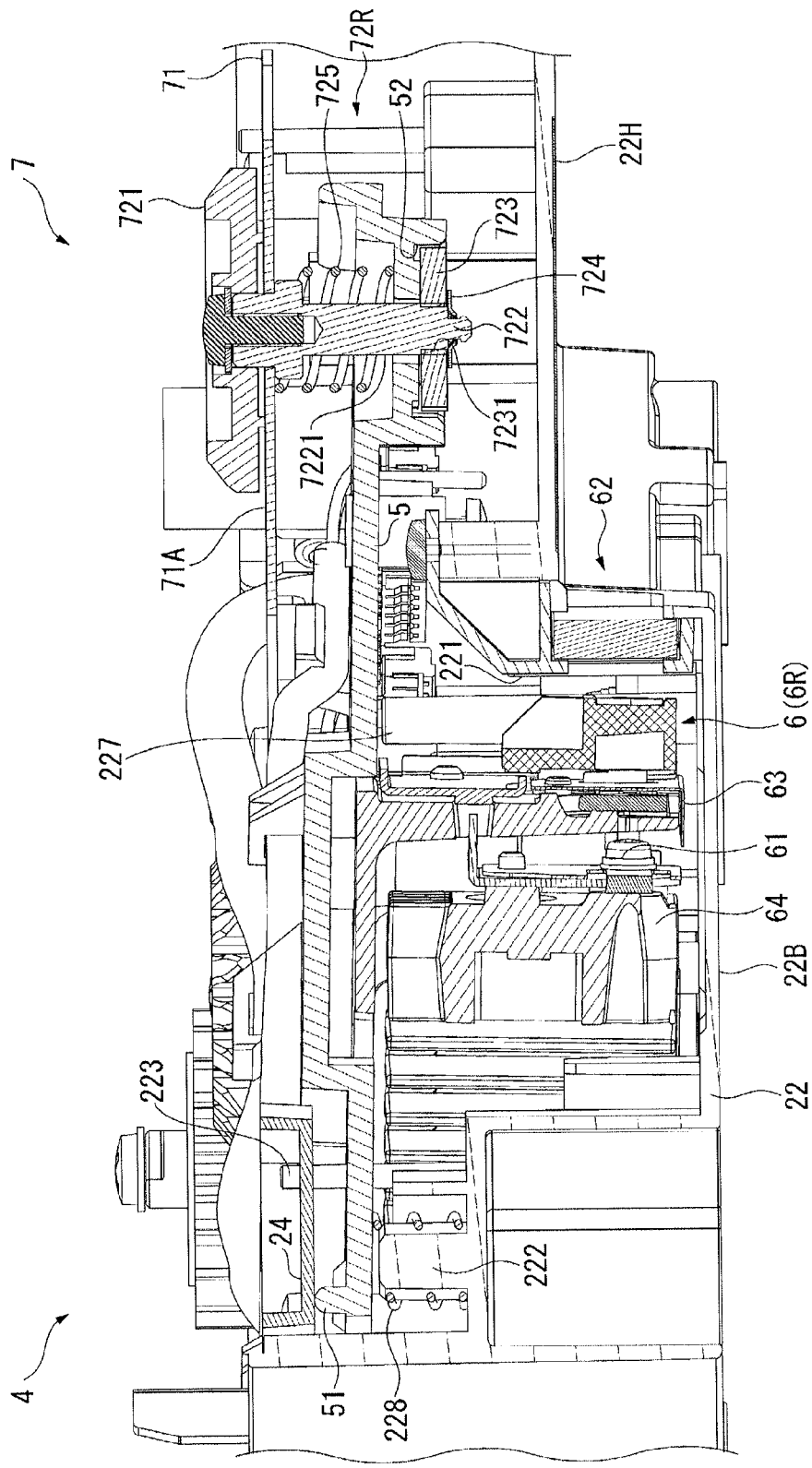
FIG. 12 is a sectional view of the light emitting device in the embodiment after the emission direction of light emitted from the light source unit is adjusted to a top surface side.

FIG. 12 is a sectional view of the light emitting device 1 after the emission direction of light emitted from the light source unit 6 is adjusted to the bottom surface portion 2B side from the state illustrated in FIG. 11. In FIG. 12, a portion of the configuration elements of the light emitting device 1 such as the upper case 21 is omitted. Similarly, a portion of the configuration elements is omitted in FIG. 13.

When a user turns the dial 211R mounted on the top surface portion 2A in one direction (clockwise or counterclockwise direction when the dial 211R is seen from the top surface portion 2A side) of A1 directions in FIG. 5, the gear 214 is also turned around the shaft portion (serving as a central axis) 213 in the same direction. As described above, the gear 214 meshes with the gear 721. For this reason, when the gear 214 is turned, the gear 721 is turned in a turning direction opposite to that of the gear 214. As the gear 721 is turned, the shaft member 722 is also turned in the same direction. The moving member 723 screwed to the shaft member 722 is fitted into the frame 5. For this reason, the moving member 723 is moved to the bottom surface portion 2B side, and as illustrated in FIG. 12, the frame 5, which is biased to the moving member 723 by the spring member 725, is inclined to the bottom surface portion 2B side around the pivotal portion 51 which serves as the center (center of turning) of inclination.

In a case where the frame 5 is inclined to the bottom surface portion 2B side in this manner, similarly, the light source unit 6 mounted on the frame 5 is also inclined to the bottom surface portion 2B side, and the emission direction of light emitted from the second light source unit 6R is also inclined to the bottom surface portion 2B side. Accordingly, a relative position between the layer of light (the interactive region LE) emitted to a predetermined region along the projection surface SC1 and the projection surface SC1 is adjusted.

Figure 13:
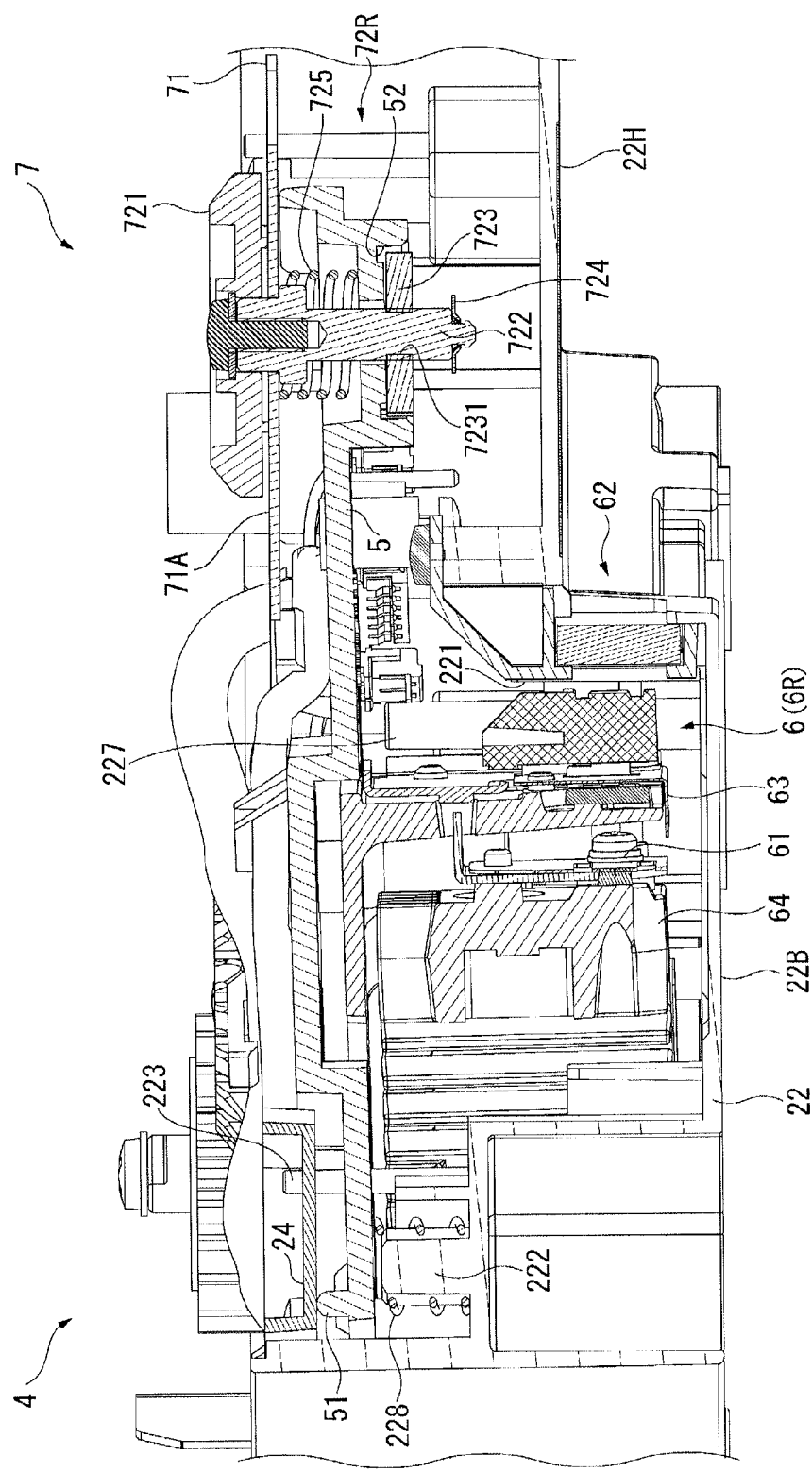
FIG. 13 is a sectional view of the light emitting device in the embodiment after the emission direction of light emitted from the light source unit is adjusted to the bottom surface side.

FIG. 13 is a sectional view of the light emitting device 1 after the emission direction of light emitted from the light source unit 6 is adjusted to the top surface portion 2A side from the state illustrated in FIG. 11.

In contrast, when a user turns the dial 211R in the other direction of the A1 directions in the state of the light emitting device 1 illustrated in FIG. 11, the gear 721 is turned via the gear 214 in a turning direction opposite to that of the dial 211R. As the gear 721 is turned, the shaft member 722 is also turned in the same direction. In contrast, as described above, the moving member 723 is not turned in the same direction as that of the gear 721. For this reason, as the shaft member 722 is turned, the moving member 723 is moved along the central axis of the shaft member 722 in a direction opposite to that illustrated in FIG. 12, that is, to the top surface portion 2A side. Accordingly, as illustrated in FIG. 13, the frame 5 biased to the moving member 723 is inclined to the top surface portion 2A side around the pivotal portion (serving as the center of inclination) 51 according to the movement of the moving member 723. The emission direction of light emitted from the second light source unit 6R is also inclined to the top surface portion 2A side due to the inclination of the frame 5. Accordingly, a relative position between the layer of light (the interactive region LE) emitted to a predetermined region along the projection surface SC1 and the projection surface SC1 is adjusted.

As described above, the frame 5 is biased to the pressing member 24 by the spring member 228. For this reason, in a case where an external impact is applied to the housing 2, for example, the light emitting device 1 falls to the ground, the frame 5 is moved along a direction (to the bottom surface portion 2B side) in which repelling force is applied to overcome biasing force from the spring member 228. As a result, it is considered that the light source unit 6 (the first light source unit 6L and the second light source unit 6R) collides with the lower case 22 (the bottom surface 22A), and is damaged.

In contrast, in a case where such an impact is applied to the housing 2, and the frame 5 is moved to the bottom surface portion 2B side, the frame 5 comes into contact with the tip portions of the multiple pins (serving as shock-absorbing portions) 227 such that the movement of the frame 5 to the bottom surface portion 2B side is suppressed. Accordingly, contact between the first light source unit 6L and the second light source unit 6R mounted on the frame 5 and the lower case 22 (the bottom surface 22A) is suppressed. As such, the multiple pins 227 serve as shock-absorbing portions such that damage to the first light source unit 6L and the second light source unit 6R is prevented.

[Adjustment of Emission Direction of Light Relative to Projection Surface]

Figure 14:
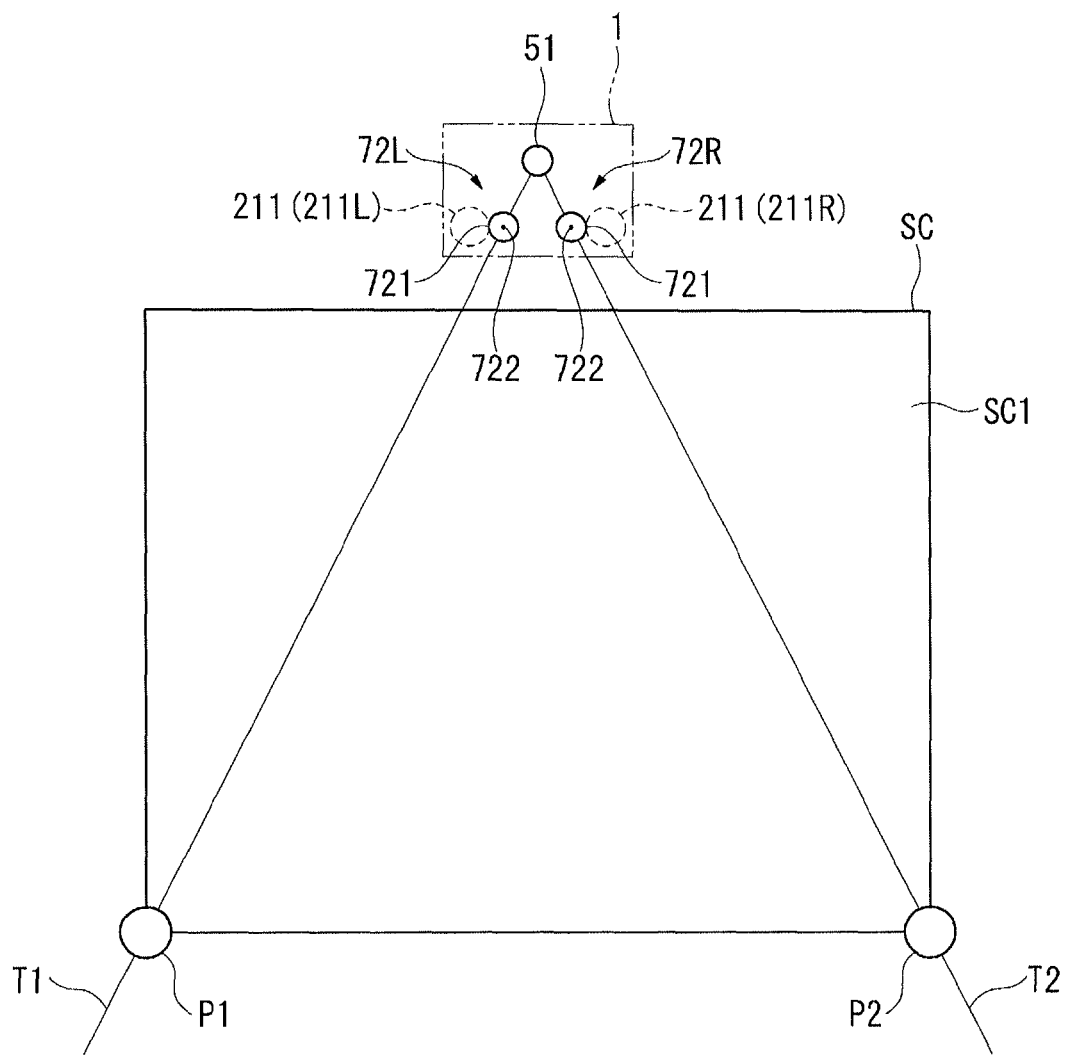
FIG. 14 is a schematic view illustrating a method of adjusting the light source unit in the embodiment.

FIG. 14 is a schematic view illustrating the method of adjusting the emission direction of light emitted from the light source unit 6.

For example, a method of adjusting the light emitting device 1 is performed as illustrated in FIG. 14.

A first pin P1 extending in the shape of a protrusion is installed in a left lower end portion of the projection screen SC1 of the screen SC. Similarly, a second pin P2 extending in the shape of a protrusion is installed in a right lower end portion of the projection screen SC1. A projection surface SC1-side end portion of each of the first pin P1 and the second pin P2 has a diameter greater than that of an end portion thereof opposite to the projection surface SC1, which is not illustrated in detail.

In contrast, the light emitting device 1 is mounted on the wall surface WS (refer to FIG. 1) such that the central axis of the shaft member 722 of the first adjustment mechanism 72L is positioned on a straight line T1 through which the pivotal portion 51 provided on the frame 5 is connected to the first pin P1, and the central axis of the shaft member 722 of the second adjustment mechanism 72R is positioned on a straight line T2 through which the pivotal portion 51 is connected to the second pin P2.

In this state, first, the emission direction of light emitted from the first light source unit 6L is adjusted relative to the first pin P1. Specifically, adjustment is performed by turning the dial 211L such that the dimension between the light layer (the interactive region LE) formed by the first light source unit 6L and the projection surface SC1 becomes approximately 1 mm in the left lower end portion of the projection surface SC1. Since the pivotal portion 51, the shaft member 722, and the second pin P2 are positioned on the straight line T2, when this adjustment is performed, it is possible to perform adjustment relative to the straight line T2 which serves as an axis. This adjustment is performed based on a captured image obtained by the image capturing device of the projector PJ. That is, since the first pin P1 becomes thinner from the projection surface SC1-side end portion toward the end portion thereof opposite to the projection surface SC1, in a case where the distance between the light layer and the projection surface SC1 is increased, the reflected position of infrared light detected in the captured image is changed on the straight line T1. For this reason, it is possible to properly adjust the dimension between the light layer and the projection surface SC1 by adjusting the emission direction of light emitted from the first light source unit 6L while turning the dial 211L based on the reflected position.

Thereafter, adjustment is performed by turning the dial 211R such that the dimension between the light layer (the interactive region LE) formed by the second light source unit 6R and the projection surface SC1 becomes approximately 1 mm in the right lower end portion of the projection surface SC1. This adjustment is performed by the same method as the method of adjusting the emission direction of light emitted from the first light source unit 6L. Since the pivotal portion 51, the shaft member 722, the first pin P1 are positioned on the straight line T1, when this adjustment is performed, it is possible to performs adjustment relative to the straight line T1 which serves as an axis.

Since, in this adjustment method, adjustment for a first pin P1 side is performed relative to the straight line T2 which serves as an axis, and adjustment for a second pin P2 side is separately performed relative to the straight line T1 which serves as an axis, it is possible to easily adjust the dimension between the layer of light emitted from each of the light source units 6R and 6L and the projection surface SC1 to a proper value with a small number of times of adjustment. That is, since the pivotal portion 51, the shaft member 722, and the first pin P1 are positioned on the straight line T1, and the pivotal portion 51, the shaft member 722, and the second pin P2 are positioned on the straight line T2, it is possible to properly adjust the dimensions between the projection surface SC1 and the layers of light emitted from the first light source unit 6L and the second light source unit 6R separately or independently.

In the aforementioned description, first, the emission direction of light emitted from the first light source unit 6L is adjusted, and then, the emission direction of light emitted from the second light source unit 6R is adjusted. However, the sequence of adjustments is not limited to that sequence illustrated in the embodiment, and may be reversely set.

In the image display system 10 including the light emitting device 1, the following effects can be obtained.

Since the frame 5 is provided with the adjustment mechanism 7 adjusting the emission direction of light emitted from the light source unit 6, relative to the predetermined flat surface (the projection surface SC1), it is possible to adjust the inclination of the frame 5 on the side of the emission direction of light, relative to the projection surface SC1. Accordingly, it is possible to adjust the emission direction of light emitted from the light source unit 6 provided in the frame 5, relative to the projection surface SC1.

Since light, which is emitted from the light emitting device 1 in the predetermined range, can be properly aligned along the projection surface (display surface) SC1, it is possible to reduce the distance between a light layer (the interactive region LE) and the projection surface SC1 to a relatively small value. For this reason, a user can easily perform an operation (for example, a double click operation) of continuously indicating a predetermined portion in an image displayed on the projection surface SC1 with an indication tool reflecting light emitted from the light emitting device 1, that is, an operation of continuously inserting into and removing the indication tool from the interactive region LE. As a result, the operability of the image display system 10 can be improved.

Since the frame 5 includes the pivotal portion 51, which is positioned opposite to the emission direction of light with respect to the adjustment mechanism 7, the adjustment mechanism 7 is capable of reliably adjusting the inclination of the frame 5 around the pivotal portion 51 relative to the projection surface SC1. As a result, it is possible to reliably adjust the emission direction of light emitted from the light source unit 6 provided in the frame 5, relative to the projection surface SC1.

It is possible to adjust the inclination of the frame relative to the projection surface SC1 via the first adjustment mechanism 72L that is positioned at one end (left surface portion 2E side) of the frame 5 in a direction intersecting the emission direction of light when the frame 5 is seen in the direction perpendicular to the projection surface SC1, and via the second adjustment mechanism 72R that is positioned at the other end (right surface portion 2F side). As a result, it is possible to minutely adjust the emission direction of light emitted from the light source unit 6 provided in the frame 5, relative to the projection surface SC1.

When the shaft member 722, which is turnably provided in the fixing member 71 fixed independently from the frame 5, is turned, the moving member 723 is moved along the central axis of the shaft member 722 such that the frame 5 is moved along the central axis of the shaft member 722. Accordingly, it is possible to minutely adjust the inclination of the frame 5 relative to the projection surface SC1 according to the turning of the shaft member 722. In a case where each of the first adjustment mechanism 72L and the second adjustment mechanism 72R has such a configuration, it is possible to more minutely adjust the inclination of the frame 5. As a result, it is possible to more minutely adjust the emission direction of light.

It is possible to reliably move the moving member 723 in a direction along the central axis of the shaft member 722 by the turning of the shaft member 722. Accordingly, it is possible to very minutely adjust the inclination of the frame 5 relative to the projection surface SC1. As a result, it is possible to very minutely adjust the emission direction of light relative to the projection surface SC1.

The shaft portion 213, which is engaged with the transmission member (the gear 214), can be indirectly turned by turning the operation member (the dial 211) by a user. Accordingly, it is possible to adjust the inclination of the frame 5 accommodated inside the housing 2 by only turning the body portion 212 provided outside of the housing 2.

In a case where the shaft member 722 is directly turned, it is considered that the frame 5 or the fixing member 71 may be deformed due to a load applied to the shaft member 722. In contrast, in the light emitting device 1, the dial 211 turns the shaft member 722 via the gear 214 such that the occurrence of such a deformation can be suppressed.

For example, it is possible to prevent a change in the emission direction of light, which is caused by the unintentional turning of the dial 211, by covering the dial 211 with the cover member (the cover 23) after ending the adjustment of the emission direction of light.

The recessed portion 215 is formed at the circumference of the body portion 212 of the dial 211 in the housing 2 along the turning direction of the dial 211. Accordingly, a space is formed such that a user can put fingers into the space to hold the body portion 212. As a result, the user can easily turn the body portion 212 along the surface (the top surface portion 2A) of the housing 2 on which the body portion 212 is provided. For this reason, the user can easily transmit force to the body portion 212, and the inclination of the dial 211 relative to the top surface portion 2A of the housing 2 is suppressed, and thus, it is possible to reduce a load to the dial 211.

The multiple pins 227 are disposed as shock-absorbing portions between the frame 5 and the housing 2 (specifically, between the frame 5 and the bottom surface 22A facing a light source unit 6-side surface of the frame 5). Accordingly, in a case where an impact is applied to the housing 2, for example, the light emitting device 1 falls to the ground, the tip portions of the multiple pins 227 come into contact with the frame 5, and thus, it is possible to suppress collision between the housing 2 and the light source unit 6. For this reason, it is possible to maintain the inclination of the frame 5 adjusted relative to the projection surface SC1 even after the light emitting device 1 falls to the ground. As a result, it is possible to maintain the emission direction of light emitted from the light source unit 6 after adjustment.

The pins 227 serving as shocking-absorbing portions are formed integrally with the housing 2 (the lower case 22). As a result, since it is not necessary to provide separate shock-absorbing portions, it is possible to suppress the complexity of a manufacturing process of the light emitting device 1, and a manufacturing cost increase.

Modification Example

The present invention is not limited to the embodiment, and includes modifications, improvements, or the like insofar as an object of the present invention can be achieved by the modifications, the improvements, or the like.

In the embodiment, the light emitting device 1 includes the first light source unit 6L and the second light source unit 6R. However, the present invention is not limited to this configuration. That is, the number of light source units may be one, or three or greater. Similarly, the light emitting device 1 includes the adjustment mechanism 7 including the first adjustment mechanism 72L and the second adjustment mechanism 72R; however, the present invention is not limited to this configuration. That is, only one of the first adjustment mechanism 72L and the second adjustment mechanism 72R may be provided. In this case, disposition of the adjustment mechanism can be properly changed.

In the embodiment, the light emitting device 1 forms one interactive region LE (that is, one light layer). However, the present invention is not limited to this configuration. That is, multiple light layers may be formed to overlap each other. In this case, the wavelength of light forming each layer may be changed. In this configuration, it is possible to know the number of layers into which an indication tool is inserted, and to detect the height position of the indication tool or the like with respect to the projection surface.

In the embodiment, the housing 2 of the light emitting device 1 includes the cover 23; however, the present invention is not limited to this configuration. Any configuration may be adopted insofar as the unintentional operation of the dial 211 can be prevented after the emission direction of light emitted from the light source unit 6 of the light emitting device 1 is adjusted. For example, a lock function may be provided to fix the dial 211. That is, the cover 23 may be not provided.

In the embodiment, the gear 214 of the dial 211 meshes with gear 721; however, the present invention is not limited to this configuration. For example, one gear may be further provided between the gear 721 and the gear 214. Accordingly, the turning direction of the dial 211 when a user operates the dial 211 coincides with the turning direction of the shaft member 722, and it is possible to more easily adjust the emission direction of light emitted from the light source unit 6.

In the embodiment, the spring member 725 is provided in each of the shaft members 722, and the spring member 228 is provided in the protrusion 222 of the lower case 22. However, the present invention is not limited to this configuration. That is, any type of member may be provided insofar as the member has biasing force, and the spring member is not limited to a coil spring.

In the embodiment, the pivotal portion 51, which serves as a pivot when the inclination of the frame 5 is adjusted by the adjustment mechanism 7, is disposed in the frame 5. However, the present invention is not limited to this configuration. For example, the pivotal portion 51 may be provided in the housing 2 (for example, the upper case 21).

A hemispherical pivotal portion may be provided on a surface of the pressing member 24 which faces the frame 5, and the frame 5 may be in contact with the pivotal portion.

A tip portion of the protrusion 222 may be formed into a hemispherical shape, and a pressing member biased by biasing means may press the frame 5 such that the frame 5 comes into contact with the tip portion.

In the embodiment, the multiple pins 227 serving as shock-absorbing portions are provided on the front surface portion 2C side of the opening portion 221. However, the present invention is not limited to this configuration. That is, the number of pins 227 can be properly set. For example, the pins 227 may be respectively provided on a first light source unit 6L side and a second light source unit 6R side, or one pin 227 may be provided. The position of disposition of the pin 227 can be properly changed.

The tip portion (surfaces coming into contact with the frame 5) of each of the multiple pins 227 serving as shock-absorbing portions are formed into the shape of a flat surface. However, the present invention is not limited to this configuration. For example, the tip portion may be formed into either of a recessed shape and a protruding shape. In a case where the tip portion has a recessed shape, the thickness of the tip portion, which is deformed when coming into contact with the frame 5, is small. Accordingly, it is possible to deform the tip portion easier than a tip portion having a protruding shape. As a result, the tip portion is capable of easily absorbing an impact by deformation. In addition, it is possible to increase the area of a tip portion. Accordingly, it is possible to further absorb an impact applied to the housing 2 when the light emitting device 1 falls to the ground.

The pin 227 has a shape extending straightly from the bottom surface (flat surface) 22A of the lower case 22; however, the shape of the pin 227 can also be properly changed, and the pins 227 may not be formed integrally with the lower case 22 (the housing 2). Elastic bodies such as coil springs or rubber may be provided instead of the pins 227 or in addition to the pins 227.

In the embodiment, the screen SC forms the projection surface SC1; however, a whiteboard may form the projection surface SC1. In this case, the light emitting device 1 may be mounted on the same wall surface on which the whiteboard is mounted. In a case where a freestanding whiteboard is used, the light emitting device 1 may be directly mounted on the whiteboard. In a case where the projector PJ projects an image onto a wall surface without using the screen SC, the light emitting device 1 may be disposed to use the wall surface as a projection surface (predetermined flat surface).

In the embodiment, the image capturing device CM forming a detection device is provided in the projector PJ; however, the present invention is not limited to this configuration. That is, the projector and the image capturing device may be separate devices.

The image generation device GN detects the indicated positions of an indicated tool operated by a user, based on a captured image obtained by the image capturing device. However, the present invention is not limited to this configuration. The image capturing device may be configured to detect indicated positions on the projection surface SC1 via the projector PJ, to analyze the coordinates of the indicated positions in an image display region on the projection surface SC1, and to transmit the coordinates to the image generation device GN.

In the image display system 10, the projector PJ is provided as a display device, and the projection surface SC1 of the screen SC, on which an image is projected and displayed by the projector PJ, is a predetermined flat surface of the present invention. However, the present invention is not limited to this configuration. For example, various devices such as a liquid crystal display, a plasma display, and an organic electro-luminescence (EL) may be adopted instead of the projector PJ and the screen SC. In this case, a display surface of the device may be used as a predetermined flat surface of the present invention.

The present application claim priority from Japanese Patent Application No. 2013-226820 filed on Oct. 31, 2013, which is hereby incorporated by reference in its entirety.

REFERENCE SIGNS LIST

1: LIGHT EMITTING DEVICE
2: HOUSING
5: FRAME
6: LIGHT SOURCE UNIT
7: ADJUSTMENT MECHANISM
10: IMAGE DISPLAY SYSTEM
21: UPPER CASE
22: LOWER CASE
23: COVER
51: PIVOTAL PORTION
71: FIXING MEMBER
72L: FIRST ADJUSTMENT MECHANISM
72R: SECOND ADJUSTMENT MECHANISM
73: MOVING MEMBER
211: DIAL
213: SHAFT PORTION
214, 721: GEAR
215: RECESSED PORTION
227: PIN (SHOCK-ABSORBING PORTION)
722: SHAFT MEMBER
CM: IMAGE CAPTURING DEVICE (DETECTION DEVICE)
GN: IMAGE GENERATION DEVICE (DETECTION DEVICE, IMAGE GENERATION DEVICE)
PJ: PROJECTOR (DISPLAY DEVICE)
SC1: PROJECTION SURFACE (PREDETERMINED FLAT SURFACE, DISPLAY SURFACE)

The invention claimed is:

1. A light emitting device comprising:
a first light source unit that emits light to a first region along a predetermined flat surface;
a second light source unit that emits light to a second region along the predetermined flat surface;
a frame in which the first light source unit and second light source unit are provided; and
an adjustment mechanism that adjusts an emission direction of light emitted from the light source unit, relative to the predetermined flat surface,
wherein the frame includes a pivotal portion,
wherein the adjustment mechanism adjusts the emission direction of light by adjusting the inclination of the frame around the pivotal portion relative to the predetermined flat surface,
wherein the first region is centered along a first direction,
wherein the second region is centered along a second direction different from the first direction, and
wherein the pivotal portion is disposed in a portion in which the first direction and second direction intersect each other.

2. The light emitting device according to claim 1,
wherein the pivotal portion is positioned opposite to the emission direction of light with respect to the adjustment mechanism, and
wherein the adjustment mechanism includes a first adjustment mechanism and a second adjustment mechanism which are provided in a portion of the frame on the side of the emission direction of light, and are disposed while being spaced therebetween in the emission direction of light when seen from a direction perpendicular to the predetermined flat surface.

3. The light emitting device according to claim 2,
wherein at least either of the first adjustment mechanism and the second adjustment mechanism includes:
a fixing member that is disposed along an end portion of the frame in the emission direction of light, and is fixed independently from the frame;
a shaft member that is turnably provided in the fixing member; and
a moving member which is engaged with the shaft member, and is moved along a central axis of the shaft member such that the frame is moved along the central axis.

4. The light emitting device according to claim 3,
wherein the shaft member includes a screwed portion that is spirally formed on a circumferential surface of the shaft member along the central axis, and is screwed to the moving member, and
wherein the moving member is in contact with the frame in a state where the turning of the moving member around the central axis is limited.

5. The light emitting device according to claim 4, further comprising:
a housing that accommodates the light source unit, the frame, and the adjustment mechanism thereinside,
wherein the fixing member is fixed inside of the housing, and
wherein the housing includes an operation member which is positioned outside of the housing, and is turnably supported by the housing, and a transmission member which includes a turning axis coaxial with that of the operation member, and is engaged with the shaft member such that the shaft member is turned by the turning of the operation member.

6. The light emitting device according to claim 5,
wherein the housing includes a cover member covering the operation member.

7. The light emitting device according to claim 5,
wherein the housing includes a recessed portion that is positioned at the circumference of the operation member, and is formed along a turning direction of the operation member.

8. The light emitting device according to claim 6,
wherein the housing includes a recessed portion that is positioned at the circumference of the operation member, and is formed along a turning direction of the operation member.

9. The light emitting device according to claim 5, further comprising:
a shock-absorbing portion which is positioned between the housing and the frame, and, when the light emitting device falls to the ground, which comes into contact with the frame such that contact between the light source unit provided in the frame and the housing is suppressed.

10. The light emitting device according to claim 6, further comprising:
a shock-absorbing portion which is positioned between the housing and the frame, and, when the light emitting device falls to the ground, which comes into contact with the frame such that contact between the light source unit provided in the frame and the housing is suppressed.

11. The light emitting device according to claim 7, further comprising:
  a shock-absorbing portion which is positioned between the housing and the frame, and, when the light emitting device falls to the ground, which comes into contact with the frame such that contact between the light source unit provided in the frame and the housing is suppressed.

12. The light emitting device according to claim 8, further comprising:
  a shock-absorbing portion which is positioned between the housing and the frame, and, when the light emitting device falls to the ground, which comes into contact with the frame such that contact between the light source unit provided in the frame and the housing is suppressed.

13. The light emitting device according to claim 9, wherein the shock-absorbing portion is formed integrally with the housing.

14. The light emitting device according to claim 10, wherein the shock-absorbing portion is formed integrally with the housing.

15. The light emitting device according to claim 11, wherein the shock-absorbing portion is formed integrally with the housing.

16. The light emitting device according to claim 12, wherein the shock-absorbing portion is formed integrally with the housing.

17. An image display system comprising:

a display device that displays a received image;

the light emitting device according to claim 1 which emits light to a region along a display surface on which the image is displayed by the display device, and forms a light layer along the display surface;

a detection device that detects the reflected positions of light, which is emitted from the light emitting device, in the region; and an image generation device that generates an image according to a detected result obtained by the detection device, and transmits the image to the display device.

* * * * *